US008769949B2

(12) United States Patent
VanDyne et al.

(10) Patent No.: US 8,769,949 B2
(45) Date of Patent: Jul. 8, 2014

(54) SUPERTURBOCHARGER CONTROL SYSTEMS

(75) Inventors: Ed VanDyne, Loveland, CO (US); Jared William Brown, Fort Collins, CO (US); Volker Schumacher, Sassenburg (DE); Christopher J. Chadwell, San Antonio, TX (US)

(73) Assignee: Vandyne Superturbo, Inc., Loveland, CO (US)

( * ) Notice: Subject to any disclaimer, the term of this patent is extended or adjusted under 35 U.S.C. 154(b) by 393 days.

(21) Appl. No.: 13/191,407

(22) Filed: Jul. 26, 2011

(65) Prior Publication Data

US 2012/0186248 A1 Jul. 26, 2012

Related U.S. Application Data

(60) Provisional application No. 61/367,821, filed on Jul. 26, 2010, provisional application No. 61/501,887, filed on Jun. 28, 2011.

(51) Int. Cl.
F02B 33/44 (2006.01)
F02B 33/00 (2006.01)
F16H 33/10 (2006.01)
B61C 15/08 (2006.01)
F02B 37/10 (2006.01)
F02B 37/14 (2006.01)
F02B 39/04 (2006.01)
F02D 41/02 (2006.01)

(52) U.S. Cl.
CPC .............. *F02B 37/105* (2013.01); *F02B 37/14* (2013.01); *F02B 39/04* (2013.01); *F02D 41/023* (2013.01); *F02D 2041/026* (2013.01)
USPC ......... 60/607; 60/608; 123/559.1; 123/559.3; 74/86; 74/87; 318/52

(58) Field of Classification Search
CPC ........ F02B 37/105; F02B 37/14; F02B 39/04; F02D 41/023; F02D 2041/026; F02D 2009/0254; F02D 2009/0267; F02D 2009/0296; F02D 2011/06; F02D 2011/102; Y02T 10/144; Y02T 10/148
USPC ............................... 60/605.1, 611, 607–609; 123/559.1–559.3, 561; 417/423.6; 477/3, 5, 37, 43, 32, 109; 318/52; 74/86, 87
See application file for complete search history.

(56) References Cited

U.S. PATENT DOCUMENTS 3,358,439 A * 12/1967 De Coye De Castelet .. 60/605.1
(Continued)

FOREIGN PATENT DOCUMENTS

EP 517675 A1 * 12/1992 ................ F16H 3/72
EP 1255031 A2 * 11/2002 .............. F02B 37/12
(Continued)

OTHER PUBLICATIONS

International Search Report, mailed Sep. 27, 2011, in PCT Application Serial No. PCT/US2011/035075.

*Primary Examiner* — Thai Ba Trieu
(74) *Attorney, Agent, or Firm* — William W. Cochran; Cochran Freund & Young LLC

(57) ABSTRACT

Disclosed is a control system and method for controlling a superturbocharged engine system in various operation modes. Throttle control mode may idle the superturbocharger during low and medium engine loads, so that boost is not created in the intake manifold. During high engine load conditions (open throttle), boosting occurs in response to the driver, operator, or control system requesting increased engine loads. For transient control mode, the control system may respond to transient conditions in response to engine speed and load so that the engine does not bog down or overcome vehicle traction limits. The control system may also predict future operating points.

13 Claims, 21 Drawing Sheets

(56) References Cited

U.S. PATENT DOCUMENTS

| | | | |
|---|---|---|---|
| 3,382,855 A * | 5/1968 | Glamann | 123/559.1 |
| 4,107,776 A * | 8/1978 | Beale | 477/43 |
| 4,136,303 A * | 1/1979 | Almquist et al. | 318/52 |
| 4,505,169 A * | 3/1985 | Ganoung | 477/43 |
| 4,548,185 A | 10/1985 | Pozniak | 60/602 |
| 4,589,302 A * | 5/1986 | Oda et al. | 477/43 |
| 4,875,454 A * | 10/1989 | Okimoto et al. | 123/559.3 |
| 5,085,288 A * | 2/1992 | Shiraishi et al. | 701/80 |
| 5,117,799 A * | 6/1992 | Suzuki et al. | 123/561 |
| 5,187,935 A | 2/1993 | Akiyama et al. | 701/108 |
| 5,307,632 A * | 5/1994 | Gottemoller et al. | 60/608 |
| 5,454,360 A * | 10/1995 | Shimizu et al. | 123/564 |
| 5,661,378 A * | 8/1997 | Hapeman | 318/52 |
| 5,713,204 A | 2/1998 | Kadlicko | 60/608 |
| 6,000,221 A * | 12/1999 | Church et al. | 60/602 |
| 6,134,890 A * | 10/2000 | Church et al. | 60/602 |
| 6,233,934 B1 * | 5/2001 | Church et al. | 60/602 |
| 6,347,519 B1 * | 2/2002 | Kreso | 60/602 |
| 6,681,574 B2 | 1/2004 | Berglund et al. | 60/609 |
| 6,681,575 B2 * | 1/2004 | Dellora et al. | 60/602 |
| 6,692,406 B2 * | 2/2004 | Beaty | 477/32 |
| 6,726,594 B2 * | 4/2004 | Mizuno et al. | 477/37 |
| 6,782,877 B2 * | 8/2004 | Nau et al. | 60/607 |
| 7,074,160 B1 | 7/2006 | Inoue et al. | 477/180 |
| 7,238,133 B2 * | 7/2007 | Tabata et al. | 475/5 |
| 7,503,870 B2 * | 3/2009 | Tabata et al. | 477/3 |
| 7,676,318 B2 * | 3/2010 | Allain | 701/103 |
| 7,765,806 B2 * | 8/2010 | Clark | 60/608 |
| 2002/0062646 A1 * | 5/2002 | Dellora et al. | 60/602 |
| 2003/0022753 A1 | 1/2003 | Mizuno et al. | 477/43 |
| 2006/0032225 A1 * | 2/2006 | Dyne et al. | 60/607 |
| 2007/0130945 A1 | 6/2007 | Rollinger et al. | 60/605.1 |
| 2009/0132153 A1 | 5/2009 | Shutty et al. | 60/605.2 |
| 2010/0199666 A1 * | 8/2010 | VanDyne et al. | 60/607 |
| 2011/0214422 A1 * | 9/2011 | VanDyne et al. | 60/607 |
| 2012/0117962 A1 * | 5/2012 | VanDyne et al. | 60/600 |
| 2012/0165151 A1 * | 6/2012 | Sherrill et al. | 475/183 |
| 2013/0017920 A1 * | 1/2013 | Sherrill et al. | 475/183 |

FOREIGN PATENT DOCUMENTS

| | | | |
|---|---|---|---|
| JP | 2002326526 A * | 11/2002 | F02B 67/00 |
| WO | 2004072449 | 8/2004 | |

* cited by examiner

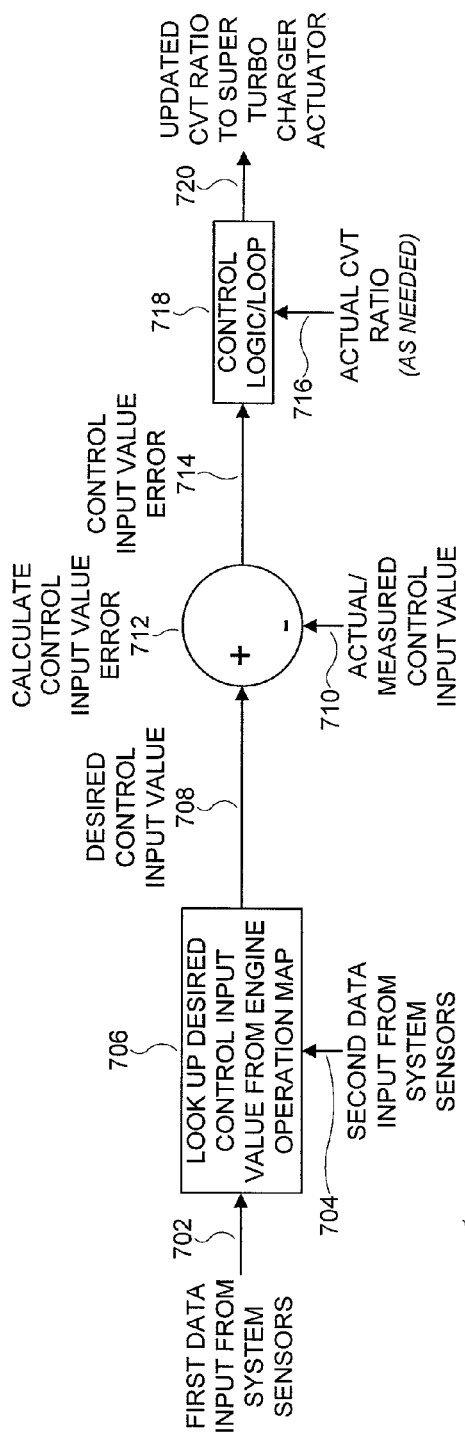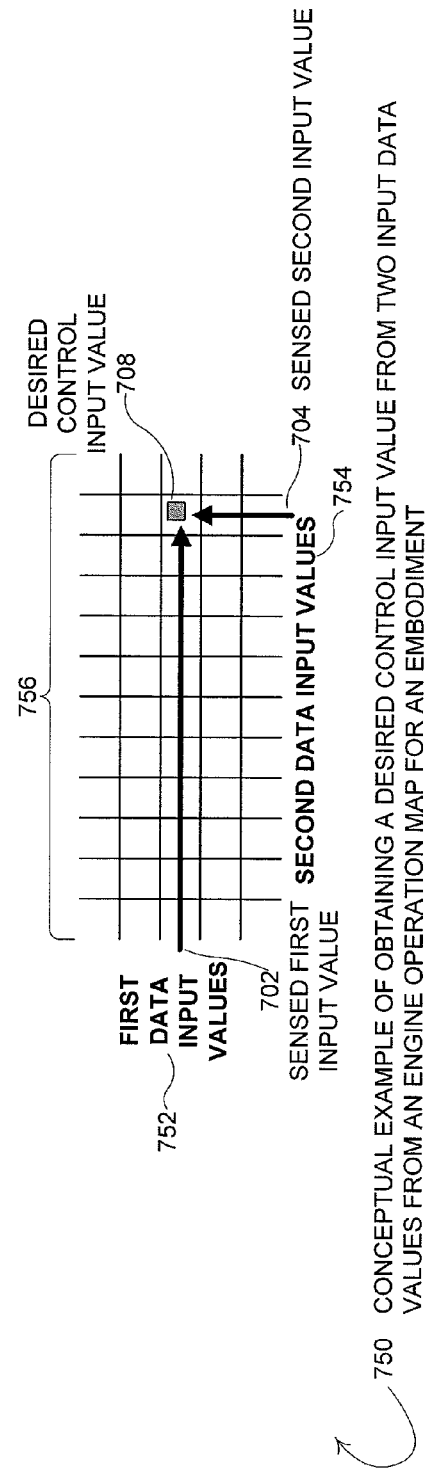
FIG. 7A — 700 TWO INPUT CONTROLLER OPERATION FOR AN EMBODIMENT
FIG. 7B — 750 CONCEPTUAL EXAMPLE OF OBTAINING A DESIRED CONTROL INPUT VALUE FROM TWO INPUT DATA VALUES FROM AN ENGINE OPERATION MAP FOR AN EMBODIMENT

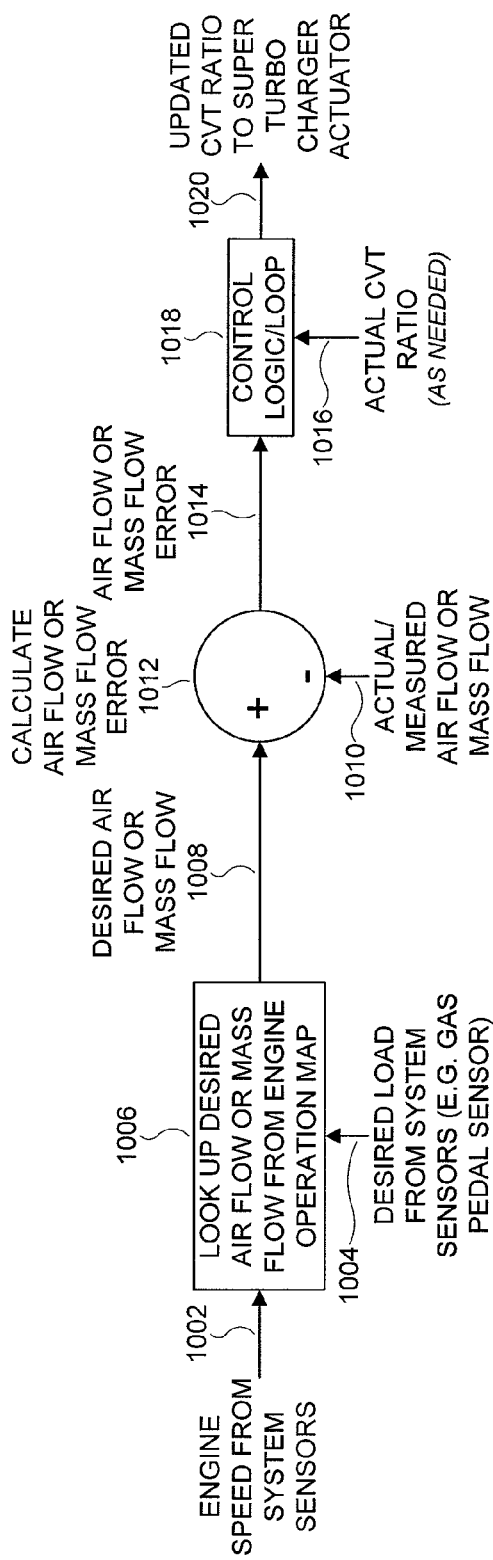
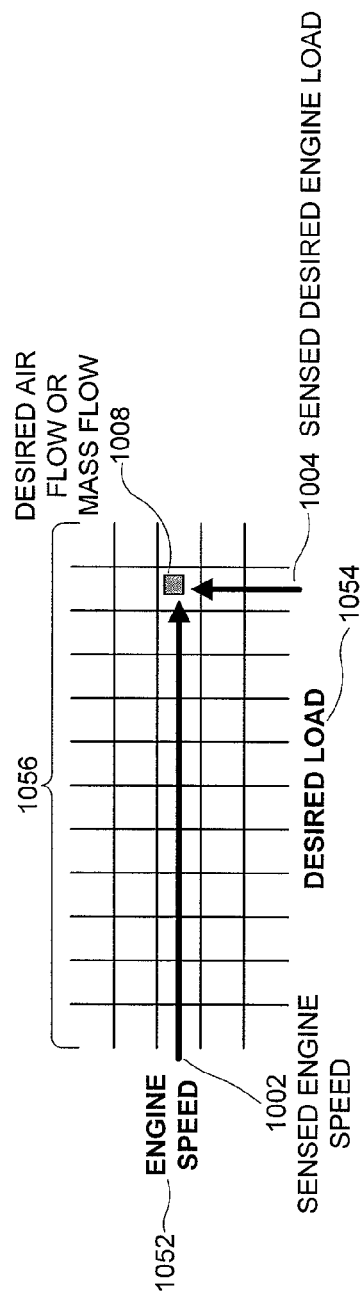
FIG. 10A
FIG. 10B

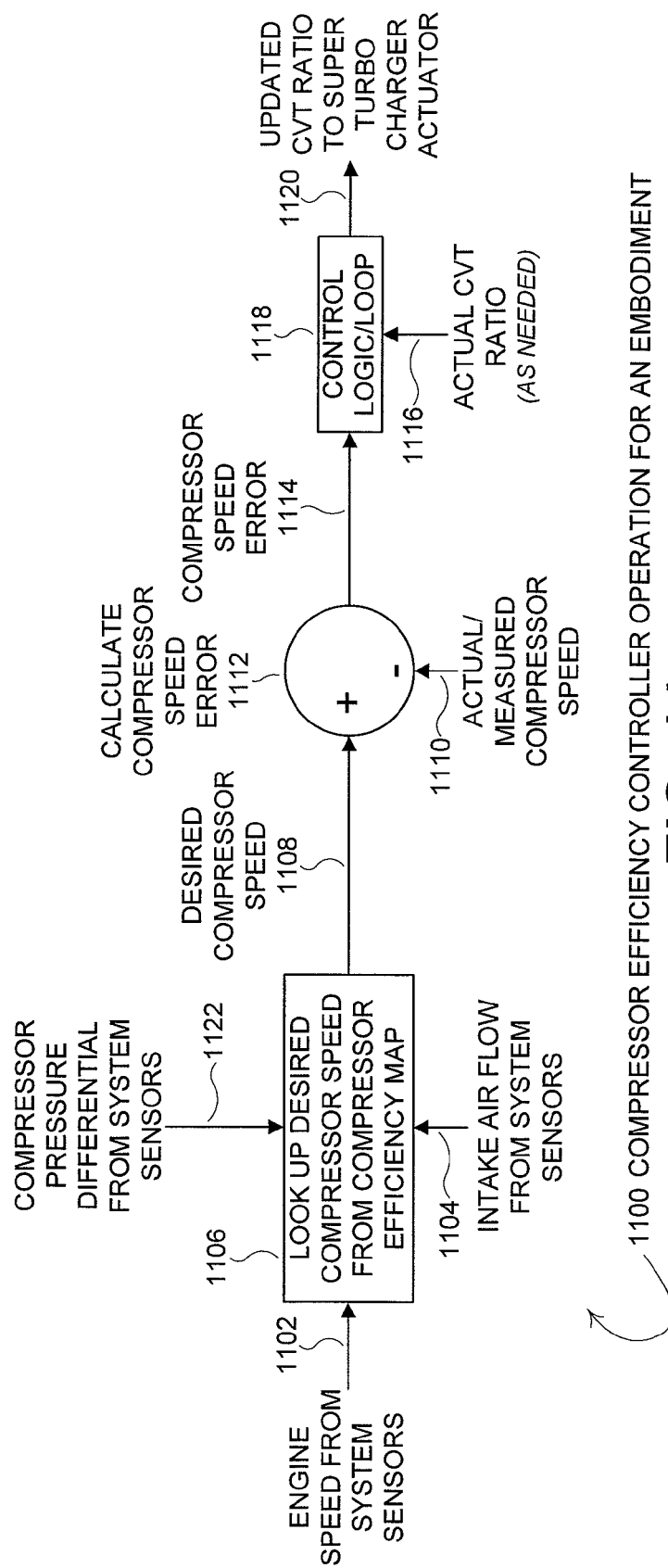

1400 ENGINE LOAD CONTROLLER OPERATION FOR AN EMBODIMENT

SUPERTURBOCHARGER CONTROL SYSTEMS

CROSS REFERENCE TO RELATED APPLICATIONS

This application is based upon and claims priority to: U.S. provisional application Ser. No. 61/367,821, filed Jul. 26, 2010, entitled "Super-Turbocharger Control Systems" and U.S. provisional application Ser. No. 61/501,887, filed Jun. 28, 2011, entitled "Superturbocharger Control Systems," all of which are specifically incorporated herein by reference for all that they disclose and teach.

BACKGROUND OF THE INVENTION

Superturbochargers provide a beneficial alternative to both superchargers and turbochargers. Superturbochargers combine the functionality of a turbocharger and a supercharger to utilize the benefits of both technologies. A Superturbocharger has the ability to utilize both waste exhaust heat and drive train torque to spin the compressor. Superturbochargers are capable of eliminating turbo lag, by allowing the engine to drive the compressor when there is an insufficient amount of hot exhaust gases to drive the turbine. Further, superturbochargers can operate as turbochargers and provide turbo-compounding when hot exhaust gases are produced, where the turbine delivers its excess energy to the crankshaft of the piston engine during medium to high engine load conditions. In this fashion, superturbochargers provide the benefits of both superchargers and turbochargers with the additional benefit of providing turbo-compounding.

SUMMARY OF THE INVENTION

An embodiment of the present invention may comprise a method of controlling a superturbocharged engine system by a superturbocharged engine control system comprising: obtaining a plurality of input data values, each of the plurality of input data values based on measurements from at least one superturbocharged engine system sensor; obtaining an actual control input value, the actual control input value based on measurements from at least one superturbocharged engine system sensor; looking up a desired control input value from an engine operation map based on the plurality of input data values; calculating a control input value error as a difference between the desired control input value and the actual control input value; performing control logic based on the control input value error to obtain an updated continuously variable transmission ratio that adjusts the superturbocharged engine system operation to correct for the control input value error; and sending the updated continuously variable transmission ratio to a continuously variable transmission of the superturbocharged engine system to adjust operation of the superturbocharged engine system in accord with the control logic.

An embodiment of the present invention may further comprise a superturbocharged engine controller for controlling a superturbocharged engine system comprising: a input data sub-system that obtains a plurality of input data values, each of the plurality of input data values based on measurements from at least one superturbocharged engine system sensor; an actual control input value sub-system that obtains an actual control input value, the actual control input value based on measurements from at least one superturbocharged engine system sensor; an engine operation map look up sub-system that looks up a desired control input value from an engine operation map based on the plurality of input data values; a control input error sub-system that calculates a control input value error as a difference between the desired control input value and the actual control input value; a control logic sub-system that performs control logic based on the control input value error to obtain an updated continuously variable transmission ratio that adjusts the superturbocharged engine system operation to correct for the control input value error; and a continuously variable transmission ratio update sub-system that sends the updated continuously variable transmission ratio to a continuously variable transmission of the superturbocharged engine system to adjust operation of the superturbocharged engine system in accord with the control logic subsystem.

An embodiment of the present invention may further comprise a superturbocharged engine controller for controlling a superturbocharged engine system comprising: means for obtaining a plurality of input data values, each of the plurality of input data values based on measurements from at least one superturbocharged engine system sensor; means for obtaining an actual control input value, the actual control input value based on measurements from at least one superturbocharged engine system sensor; means for looking up a desired control input value from an engine operation map based on the plurality of input data values; means for calculating a control input value error as a difference between the desired control input value and the actual control input value; means for performing control logic based on the control input value error to obtain an updated continuously variable transmission ratio that adjusts the superturbocharged engine system operation to correct for the control input value error; and means for sending the updated continuously variable transmission ratio to a continuously variable transmission of the superturbocharged engine system to adjust operation of the superturbocharged engine system in accord with the control logic.

An embodiment of the present invention may further comprise a method of controlling a superturbocharged engine system which has a superturbocharger having a continuously variable transmission comprising: detecting engine load of the engine system; detecting a throttle position of a throttle in the engine system; generating a control signal based on a requested load and the engine load; controlling a effective drive ratio of the continuously variable transmission in response to the control signal so that boost is created by the superturbocharger when the throttle is substantially open.

An embodiment of the present invention may further comprise an engine system having an engine and a superturbocharger that operates with increased efficiency comprising: the superturbocharger comprising: a turbine that receives exhaust gases from the engine system; a compressor coupled to the turbine with a turbo-shaft, that generates a source of compressed air; a continuously variable transmission coupled to the shaft and the engine; a controller coupled to the continuously variable transmission that controls the superturbocharger in response to an engine load signal and a throttle position signal, that indicates a position of the throttle, so that boosting is created when the throttle position signal indicates that the throttle is in at least a substantially open position.

An embodiment of the present invention may further comprise a system for controlling a superturbocharged engine system comprising: means for detecting engine load of the engine system; means for detecting a load request; means for generating a control signal based on the load request and the engine load; means for controlling an effective drive ratio of a continuously variable transmission in response to the control signal so that boost is created by the superturbocharger when the throttle is substantially open, and turbocompounding is utilized to control rotational speed of the superturbocharger until the throttle is substantially open, so that rotational mechanical energy from the superturbocharger is used to drive the engine system using turbocompounding whenever the throttle is not substantially open.

An embodiment of the present invention may further comprise an engine system having an engine and a superturbocharger that operates with increased efficiency comprising: the superturbocharger comprising: turbine means for receiving exhaust gases from the engine system; compressor means coupled to the turbine with a turbo-shaft for generating a source of compressed air; continuously variable transmission means for coupling the shaft to the engine; controller means coupled to the continuously variable transmission for controlling the superturbocharger in response to an engine load request signal and a throttle position signal, that indicates a position of the throttle, so that turbocharging is performed when the throttle position signal indicates that the throttle is in at least a substantially open position, and turbocompounding is performed when the throttle position signal indicates that the throttle is in a position that is less than the substantially open position.

An embodiment of the present invention may further comprise a method of controlling a superturbocharged engine system comprising: detecting engine speed of the engine system; controlling a rate of change of the effective drive ratio of a continuously variable transmission in response to the engine speed and load so that a change in engine speed associated with the change in the effective drive ratio of the continuously variable transmission is within a threshold amount, the continuously variable transmission controlled to coupling rotational mechanical energy to and from a crankshaft of the engine system to and from a shaft coupling a turbine and a compressor of the superturbocharger.

An embodiment of the present invention may further comprise an engine system having an engine and a superturbocharger, comprising: the superturbocharger comprising: a turbine that receives exhaust gases from the engine system; a compressor coupled to the turbine with a turbo-shaft, that generates a source of compressed air; a continuously variable transmission coupled to the turbo-shaft and the engine; a controller coupled to the continuously variable transmission that controls the superturbocharger to control a rate of change of a effective drive ratio of the continuously variable transmission in response to an engine speed so that a change in engine speed associated with the change in the effective drive ratio of the continuously variable transmission is within a threshold amount.

An embodiment of the present invention may further comprise a method of controlling a superturbocharged engine system comprising: receiving an indicator of torque capacity; controlling a rate of change of an effective drive ratio of a continuously variable transmission in response to the indicator of torque capacity so that a torque output by the superturbocharged engine system does not exceed a torque associated with the indicator of torque capacity.

An embodiment of the present invention may further comprise an engine system having an engine and a superturbocharger comprising: the superturbocharger comprising: a turbine that receives exhaust gases from the engine system; a compressor coupled to the turbine with a turbo-shaft, that generates a source of compressed air; a continuously variable transmission coupled to the turbo-shaft and the engine; a controller coupled to the continuously variable transmission that controls the superturbocharger in response to the indicator of torque capacity so that a torque output by the superturbocharged engine system does not exceed a torque associated with the indicator of torque capacity.

An embodiment of the present invention may further comprise a method of controlling a superturbocharged engine system comprising: predicting an engine operating condition will change from a first operating condition to a second operating condition; determining an effective drive ratio of a continuously variable transmission based on the second operating condition; changing the effective drive ratio of the continuously variable transmission based on the second operating condition toward the determined effective drive ratio before the engine operating condition changes from a first operating condition to the second operating condition.

An embodiment of the present invention may further comprise an engine system having an engine and a superturbocharger, comprising: the superturbocharger comprising: turbine means that receives exhaust gases from the engine system; compressor means coupled to the turbine means with a turbo-shaft, that generates a source of compressed air; continuously variable transmission means coupled to the turbo-shaft and the engine; controller means coupled to the continuously variable transmission means that controls the superturbocharger to control a rate of change of a effective drive ratio of the continuously variable transmission means in response to an engine speed so that a change in engine speed associated with the change in the effective drive ratio of the continuously variable transmission means is within a threshold amount.

An embodiment of the present invention may further comprise an engine system having an engine and a superturbocharger means, comprising: the superturbocharger means comprising: turbine means that receives exhaust gases from the engine system; compressor means coupled to the turbine means with a turbo-shaft, that generates a source of compressed air; continuously variable transmission means coupled to the turbo-shaft and the engine; controller means coupled to the continuously variable transmission means that controls the superturbocharger means in response to the indicator of torque capacity so that a torque output by the superturbocharged engine system does not exceed a torque associated with the indicator of torque capacity.

An embodiment of the present invention may further comprise a superturbocharged engine system that has a superturbocharger having a continuously variable transmission comprising: prediction means that predicts an engine operating condition will change from a first operating condition to a second operating condition; effective drive ratio determining means that determines an effective drive ratio of the continuously variable transmission based on the second operating condition; continuously variable transmission control means that changes the effective drive ratio of the continuously variable transmission based on the second operating condition toward the determined effective drive ratio before the engine operating condition completes a transition from a first operating condition to the second operating condition.

BRIEF DESCRIPTION OF THE DRAWINGS

In the drawings,

FIG. 7A is a diagram of the operation of a two input controller for an embodiment.

FIG. 7B is a conceptual diagram of obtaining a desired control input value from a table characterizing a two input data value engine operation map for an embodiment.

FIG. 10A is a diagram of the operation of an air flow or mass flow controller for an embodiment.

FIG. 10B is a conceptual diagram of obtaining a desired air flow or mass flow value from a table characterizing an engine speed versus desired load engine operation map for an embodiment.

FIG. 11 is a diagram of the operation of a compressor efficiency controller for an embodiment.

DETAILED DESCRIPTION OF THE EMBODIMENTS

The disclosure with respect to FIGS. 1-5 regards the general operation of a superturbocharger system, including the physical operation of the compressor, turbine, continuously variable transmission (CVT), engine, various other physical parameters of a superturbocharger system, operating states of the superturbocharger system (e.g., turbocompounding, turbo charging, turbo lag), control operation for various operating states of the superturbocharger system with particular regard to control at different throttling positions of the engine, etc. The disclosure with respect to FIGS. 6-17 regards particular superturbocharger control systems that control the overall load of the superturbocharger/engine system either without the need for throttling to control the engine load or independent of the throttling of the engine (i.e., the throttle is held at a fixed position and the superturbocharger continuously variable transmission is used to control the overall system load). The disclosure with respect to FIGS. 18-21 regards a superturbocharger control system that responds to transient conditions, such as rate of change of effective drive ratio in response to engine speed and load so that the engine does not bog down and/or so that a torque capacity is not exceeded.

Figure 1:
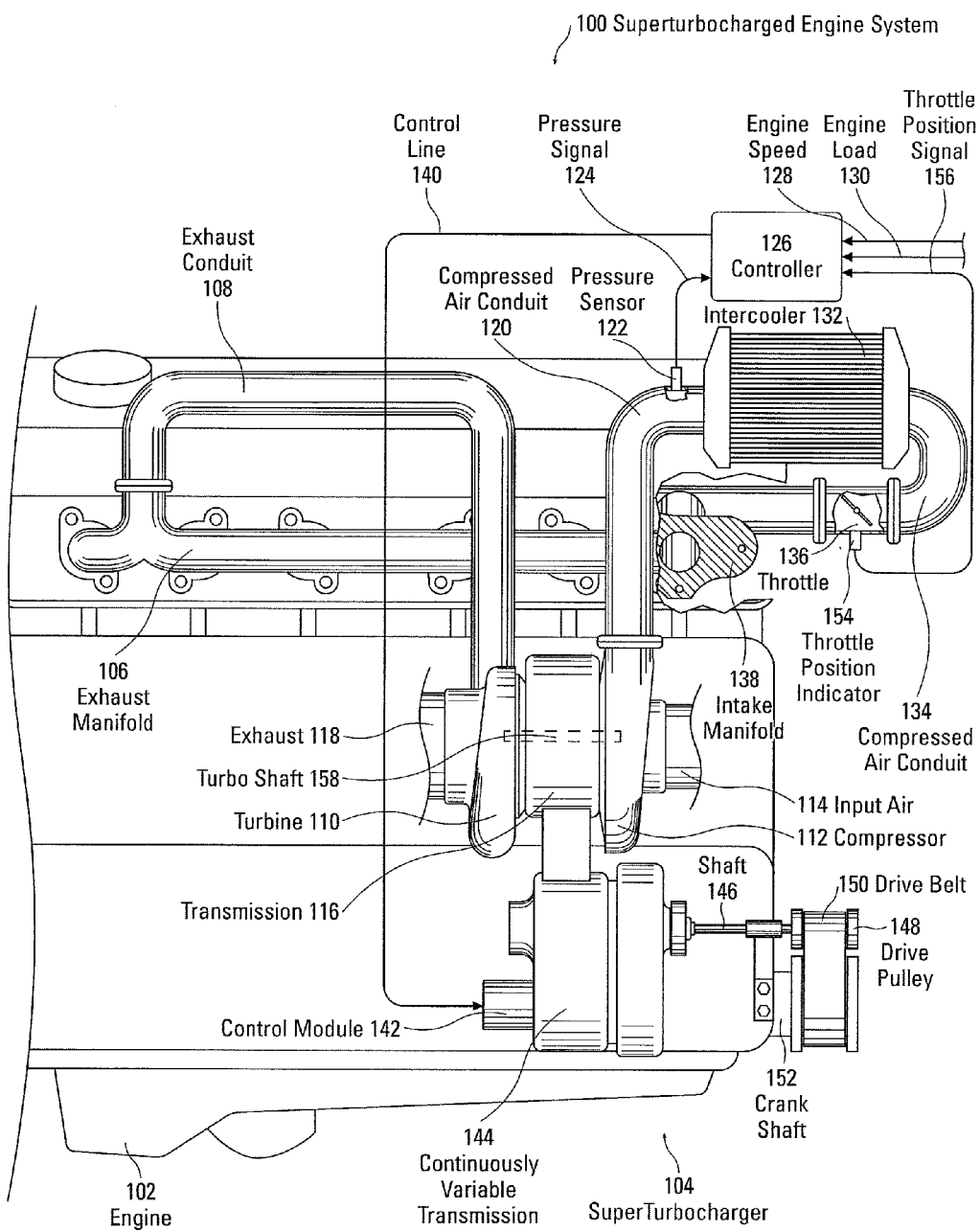
FIG. 1 is a schematic illustration of a superturbocharged engine system.

FIG. 1 is a schematic illustration of a superturbocharged engine system 100. A "super turbocharger" is a device with at least one compressor and at least one turbine that is connected to a power transmission device that can transmit power in both directions to and from the crank shaft of any piston engine it is attached to. The power transmission device can comprise any type of electrical motor, mechanical transmission, hydraulic transmission, Continuously Variable Transmission, traction transmission, or multi-clutch transmission. As illustrated in FIG. 1, engine 102 is coupled to a superturbocharger 104. Superturbocharger 104 has an exhaust conduit 108 that is coupled to exhaust manifold 106. Exhaust conduit 108 is coupled to a turbine 110 of the superturbocharger 104. Exhaust from the exhaust conduit 108 drives the turbine 110 and the exhaust exits from the exhaust port 118 to an exhaust pipe (not shown). The turbine 110, in turn, drives the compressor 112. Compressor 112 receives input air 114 and compresses the input air, which is applied to compressed air conduit 120. Pressure sensor 122 detects the pressure of the compressed air in the compressed air conduit 120. The compressed air is applied to intercooler 132, which cools the compressed air. The cooled compressed air is applied to compressed air conduit 134. Throttle 136 controls the flow of the compressed air into the intake manifold 138. In this manner, cooled compressed air is applied to the intake manifold 138 to boost the pressure of air applied to the engine during high engine loads.

As also shown in FIG. 1, transmission 116 receives power from a shaft 158 connecting the turbine 110 and the compressor 112. The transmission 116 supplies rotational mechanical energy from the shaft 158 that connects the turbine 110 and the compressor 112, to a continuously variable transmission (CVT) 144. A "continuously variable transmission" (CVT) is a transmission in the superturbocharger 104 that can change steplessly through an infinite number of effective drive ratios between maximum and minimum values. A continuously variable transmission could be any one of the following: a Speed Summing Differential; or a Variable Displacement Hydraulic Transmission; or an Infinitely Variable Transmission (simply a type of continuously variable transmission that can reach zero output speed as one of its operating conditions); or a V-belt type continuously variable transmission; or a half toroidal type continuously variable transmission; or a full toroidal type continuously variable transmission. Control module 142 controls the operation of the continuously variable transmission 144 in response to a control signal 140. Control signal 140 is generated by a controller 126. Controller 126 may generate the control signal 140 in response to one or more of pressure signal 124, engine speed signal 128, engine load signal 130, throttle position signal 156, measured temperature signal(s) (not shown), wheel rpm signal(s) (not shown), wheel slip signal(s) (not shown), traction control system signal(s) (not shown), accelerometer signal(s) (not shown), drive input signal(s) (e.g., throttle or gear shift) (not shown), manifold pressure signal 124 (i.e., boost pressure), an air flow signal(s) (not shown), air mass flow signal(s) (not shown), compressor speed signal(s) (not shown), fuel flow signal(s) (not shown), continuously variable transmission effective drive ratio (not shown), transmission shift signal(s) (not shown), or other signals that indicate the condition, load, configuration, state, or anticipated state of the vehicle, engine, superturbocharger system, control system(s), subsystems of the aforementioned, or the like.

In an embodiment, the engine speed signal 128 and engine load signal 130 may be supplied by an engine computer system (not shown). In response to the control signal 140, the continuously variable transmission 144 transfers power to and from shaft 146. Shaft 146 is connected to a drive pulley 148. Drive pulley 148 is connected to a drive belt 150. Drive belt 150 is coupled to the crank shaft 152.

In operation, the control module 142 is controlled by the control signal 140 that is generated by the controller 126. Controller 126 determines when turbocompounding is desired, or when turbocharging is needed to turbocharge the engine 102. Turbocompounding occurs when the speed of the continuously variable transmission 144 is controlled to pull power from the shaft 158, connecting turbine 110 and compressor 112, through transmission 116 to drive shaft 146, drive pulley 148, drive belt 150, and crankshaft 152. In other words, control module 142 slows the continuously variable transmission 144, which slows the rotation of the turbine 110 and compressor 112 and draws power from the turbine 110 to drive the crankshaft 152. This process slows the rotational speed of the turbine 110 and compressor 112.

To avoid turbo lag, the crankshaft 152 can drive the drive belt 150, drive pulley 148, shaft 146, and continuously variable transmission 144, which, in turn, drives shaft 158, which drives the compressor 112 to provide compressed air when there is an insufficient amount of hot exhaust gas in the exhaust conduit 108 to drive turbine 110. This may occur during initial acceleration, when there is low engine speed.

A third condition exists when full power is desired. Throttle 136 may be in a wide open configuration. Turbine 110 is supplied with exhaust gases and drives compressor 112. Continuously variable transmission 144 is allowed to freewheel, so that the compressor can operate to supply compressed air to the inlet manifold 138, and engine 102 can be turbocharged.

In normal turbochargers, the throttle is the main control over the engine load. The turbocharger is allowed to spin freely, as more exhaust gases are applied to the turbine. The mass flow of the exhaust gases through the turbine increases the rotational speed of the compressor, which, in turn, increases the boost in the inlet manifold. Although the additional boost is needed for engine loads, at moderate engine loads, the boost is unnecessary. In other words, the engine can operate as a normally aspirated engine, and the additional power to spin the turbine and compressor is not necessary.

Since boost (in the intake manifold) is not needed at moderate loads, the throttle is used to lower the intake manifold pressure in typical turbochargers. The opening of the throttle is reduced, which reduces the air flow to the intake manifold so that the desired engine load is created. This produces pumping and throttling losses, since the power used to drive the compressor is not utilized. In standard turbochargers, a waste gate is opened, which diverts the exhaust gases around the turbine and lowers exhaust back pressure. This process of opening a waste gate adds additional turbo lag and reduces the overall efficiency of the system at least by the amount of energy of the exhaust gases that are diverted around the turbine.

A superturbocharged engine can be operated in a manner that substantially eliminates these inefficiencies. During moderate load conditions, when additional boost is not required, the CVT is down-shifted to lower the rotational speed of the turbo-shaft. By lowering the rotational speed of the turbo-shaft 158, the rotational speed of the compressor 112 is reduced and the boost pressure of the compressed gases applied to the intake manifold 138 are reduced, so that throttling back is not necessary. Accordingly, in low or moderate engine load conditions, controller 126 generates a control signal on control line 140, which is applied to the control module 142, so that the continuously variable transmission 144 has a low effective drive ratio. By generating a low effective drive ratio in the continuously variable transmission 144, the rotational speed of the turbine 110 is reduced and the energy from the turbine is supplied to crankshaft 152. Moreover, the reduced rotational speed of the turbine reduces the back flow pressure in the exhaust conduit 108, which allows the engine 102 to run more efficiently. As the engine load increases, the throttle 136 can operate the engine 102 as a normally aspirated engine until the throttle is wide open and additional engine load is desired. As the throttle approaches the fully open position, and additional engine load is desired, the control signal on control line 140, that is applied to control module 142, increases the effective drive ratio of the continuously variable transmission 144. As the effective drive ratio of the continuously variable transmission 144 increases, the rotational speed of the turbine 110 increases, as well as the rotational speed of the compressor, which causes additional boost to be applied to the intake manifold 138. When the throttle is in a fully open position and additional engine load is required, the effective drive ratio of the continuously variable transmission 144 is increased by the controller 126 which allows turbine 110 and compressor 112 to function in a full turbocharging mode.

Referring again to FIG. 1, controller 126 receives the engine load signal 130, as well as the engine speed signal 128, which comprise data that is used by controller to generate the control signal on control line 140. Additionally, pressure sensor 122 detects the pressure in the compressed air conduit 120 and generates a pressure signal 124 that is applied to the controller 126, which the controller 126 uses to generate the control signal on control line 140. Further, throttle position indicator 154 generates a throttle position signal 156 that is also applied to the controller 126. The controller 126 uses the throttle position signal 156, the engine load signal 130, and the engine speed signal 128, as well as the pressure sensor signal 122, to generate the control signal that is applied to the control module 142, via control line 140.

Figure 2:
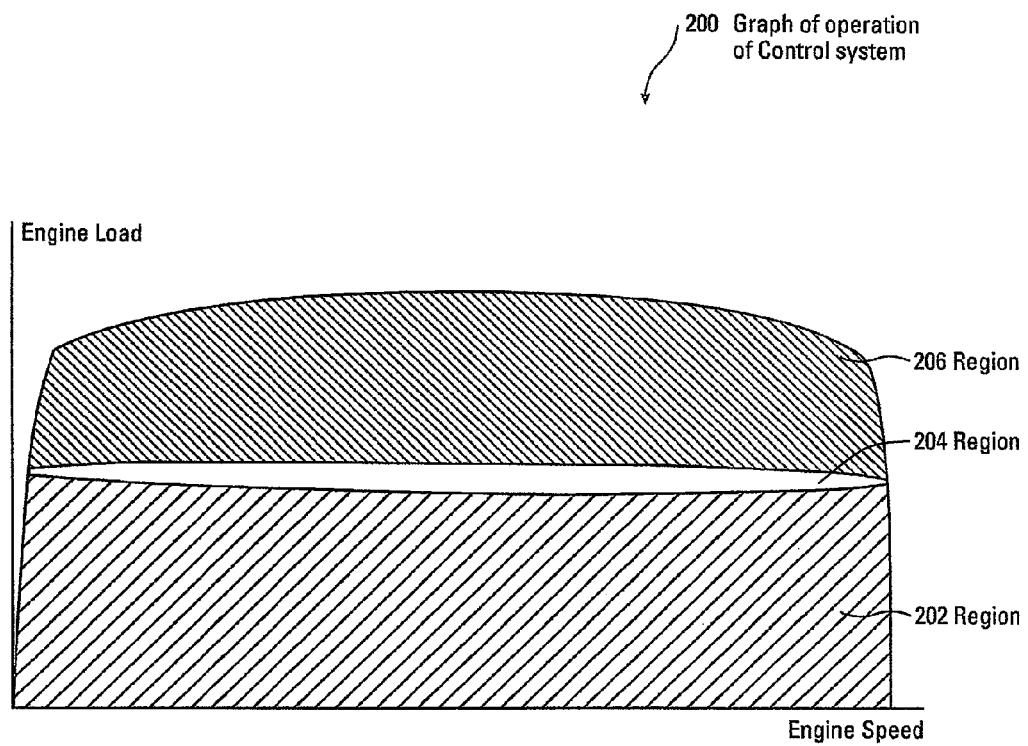
FIG. 2 is a graph illustrating the operation of the superturbocharged engine in response to the control system.
Figure 3:
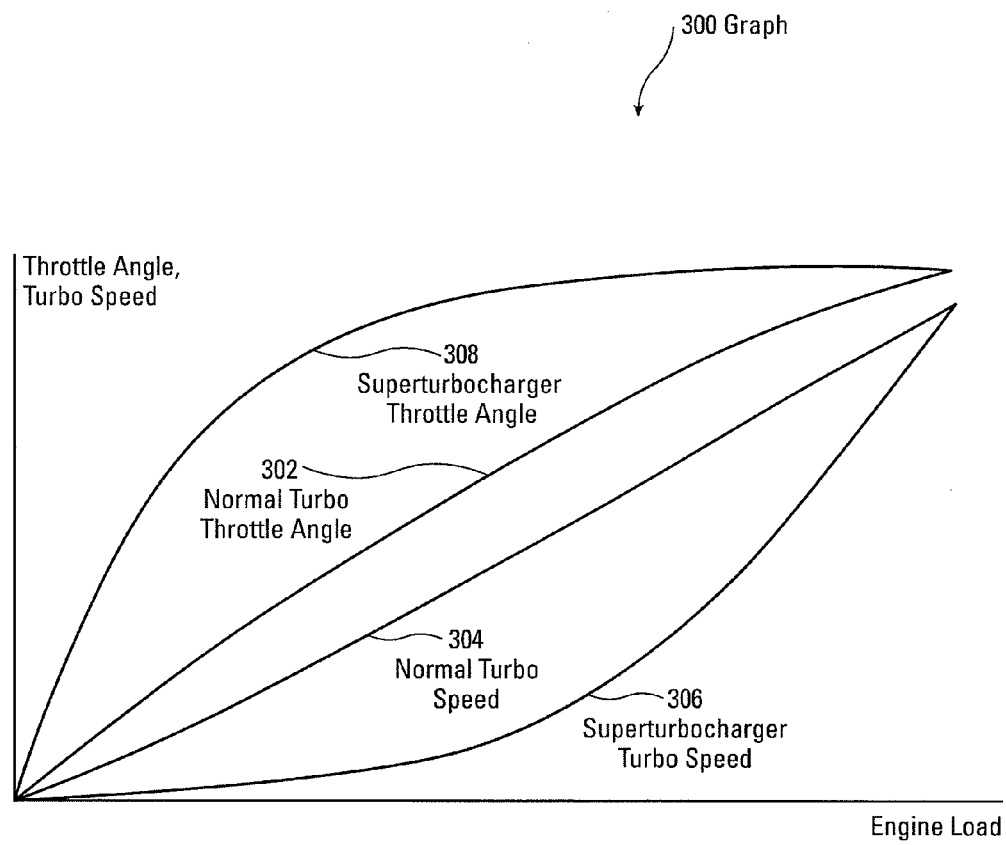
FIG. 3 is a graph of throttle angle and turbo speed versus engine load.

FIG. 2 is a graph 200 of engine load versus engine speed that illustrates the manner in which the controller 126 operates. As shown in FIG. 2, there are three distinct regions of operation. In region 202, there is low to moderate engine load when the engine is operating at various speeds. Region 204 is a transition region in which the engine, which is operating at various speeds, transitions from a moderate engine load to a high engine load and the throttle 136 is operated from a nearly open position to a fully open position. Region 206 is a region in which there is high engine load at various engine speeds and the throttle 136 is in a wide open position. The continuously variable transmission 144 is shifted to speed up the turbo-shaft 158 which provides additional boost to match a requested load. The particular shape and size of region 204 varies with different engines. The particular shape and size of the transition region 204 can be determined empirically for each different type of engine, to ensure a smooth transition between region 202 and region 206, to ensure that there is no turbo lag and the efficiency of the overall system is maintained FIG. 3 is a graph 300 of throttle angle and turbo speed versus engine load for normal turbochargers and an embodiment of a superturbocharger that operates under the control of one embodiment of a control system in accordance with the present invention. As shown in FIG. 3, the throttle angle 302 of a normal turbocharger is increased gradually, as the engine load increases. As shown in plot 304, the turbine speed also increases consistently with the throttle angle, as shown in plot 302. In accordance with at least one embodiment of the present invention, plot 306 illustrates the manner in which the turbine speed increases with engine load, while plot 308 illustrates the throttle angle with respect to engine load. As shown in FIG. 3, plot 308 illustrates an increase in the throttle angle for various engine loads and the speed of the turbine, as shown by plot 306 for corresponding engine loads. FIG. 3 illustrates that the turbo speed 306 is maintained at very low rotational speeds, until the throttle is opened to a substantially fully open position. As the throttle angle is moved to nearly the substantially open position, the turbo speed is increased, which increases the boost in the intake manifold to provide greater engine loads. Accordingly, unwanted boost that has to be throttled back is not generated and the power generated by the turbine from the exhaust gases is used for turbocompounding to drive the crankshaft 152 of engine 102. By driving the crankshaft 152, in response to controlling the continuously variable transmission 144, a low rotational speed of the turbine 110 is maintained and back pressure in the exhaust conduit 108 is not created, which provides even additional efficiencies in the superturbocharged engine system 100. In this manner, the crankshaft 152 is effectively used as a brake on shaft 158, preventing the turbine 110 and the compressor 112 from increasing in rotational speed, which would normally occur in standard turbocharged systems. In other words, instead of using the exhaust energy to pump excess air through the compressor, which occurs in normal turbocharged engines, the exhaust energy is used to provide additional power to the engine crankshaft using turbocompounding, which is a more efficient engine operating mode. Moreover, turbo lag is not created, since the crankshaft can be used to drive the continuously variable transmission 144 and rotate the compressor by simply changing the effective drive ratio of the continuously variable transmission 144 via control module 142.

The control system, as implemented by controller 126, is programmed to maintain the effective drive ratio of the continuously variable transmission 144 at or near the lowest effective drive ratio for low to mid range engine loads, and only increase the effective drive ratio when the throttle approaches a nearly open position, and boost is required to reach a desired higher engine load. Once the load limit of the naturally aspirated engine is reached, the throttle remains in an open position and the effective drive ratio of the continuously variable transmission 144 is used to control engine power.

Figure 4:
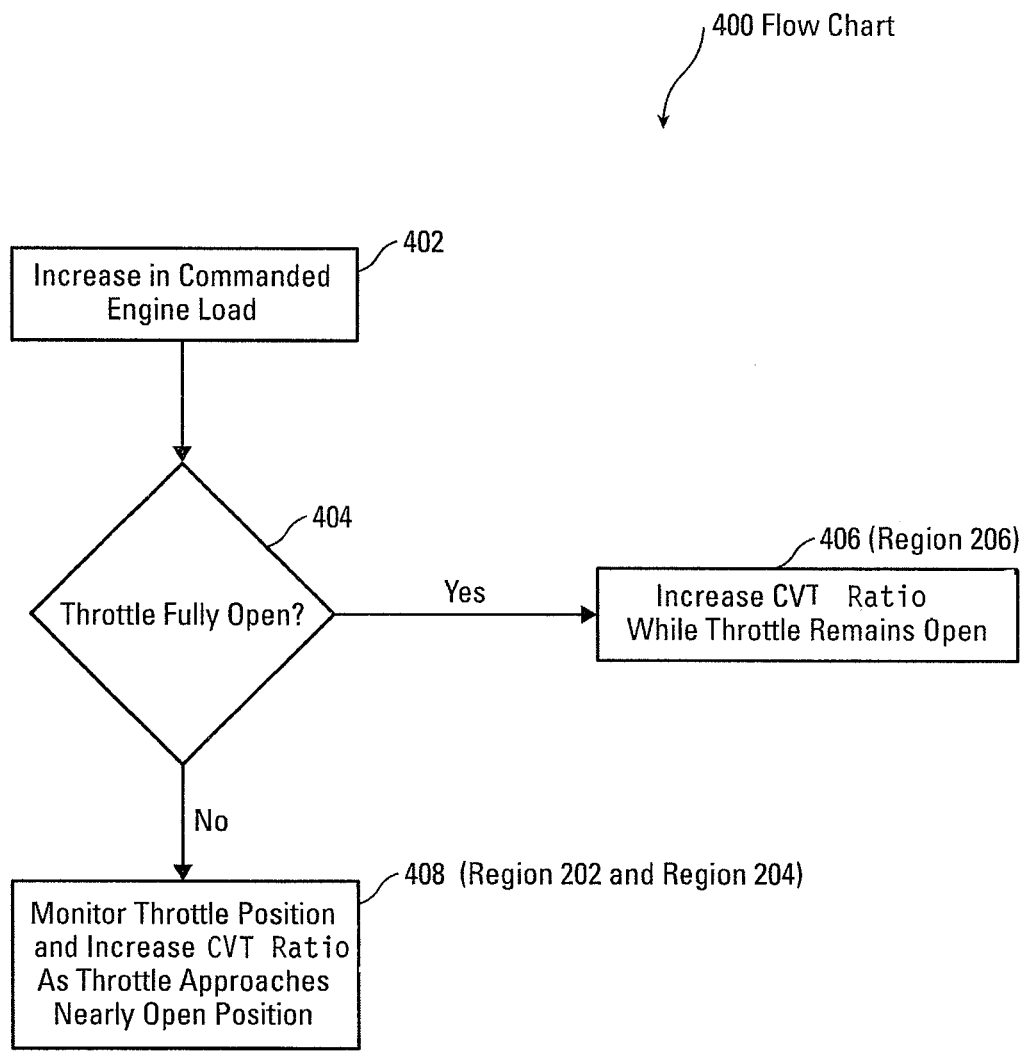
FIG. 4 is a flow chart illustrating the operation of the superturbocharged engine system during increased engine load.

FIG. 4 is a flow chart 400 illustrating the operation of the controller 126. At step 402, there is an increase in the commanded engine load. At step 404, it is determined whether the throttle is fully open. If the throttle is fully opened, the logic proceeds to step 406. At step 406, the effective drive ratio of the continuously variable transmission 144 is increased, so that the effective drive ratio controls the engine load. If it is determined, at step 404, that the throttle is not fully open, the process proceeds to step 408. At step 408, the throttle position is monitored and the effective drive ratio is increased as the throttle approaches a nearly open position.

Figure 5:
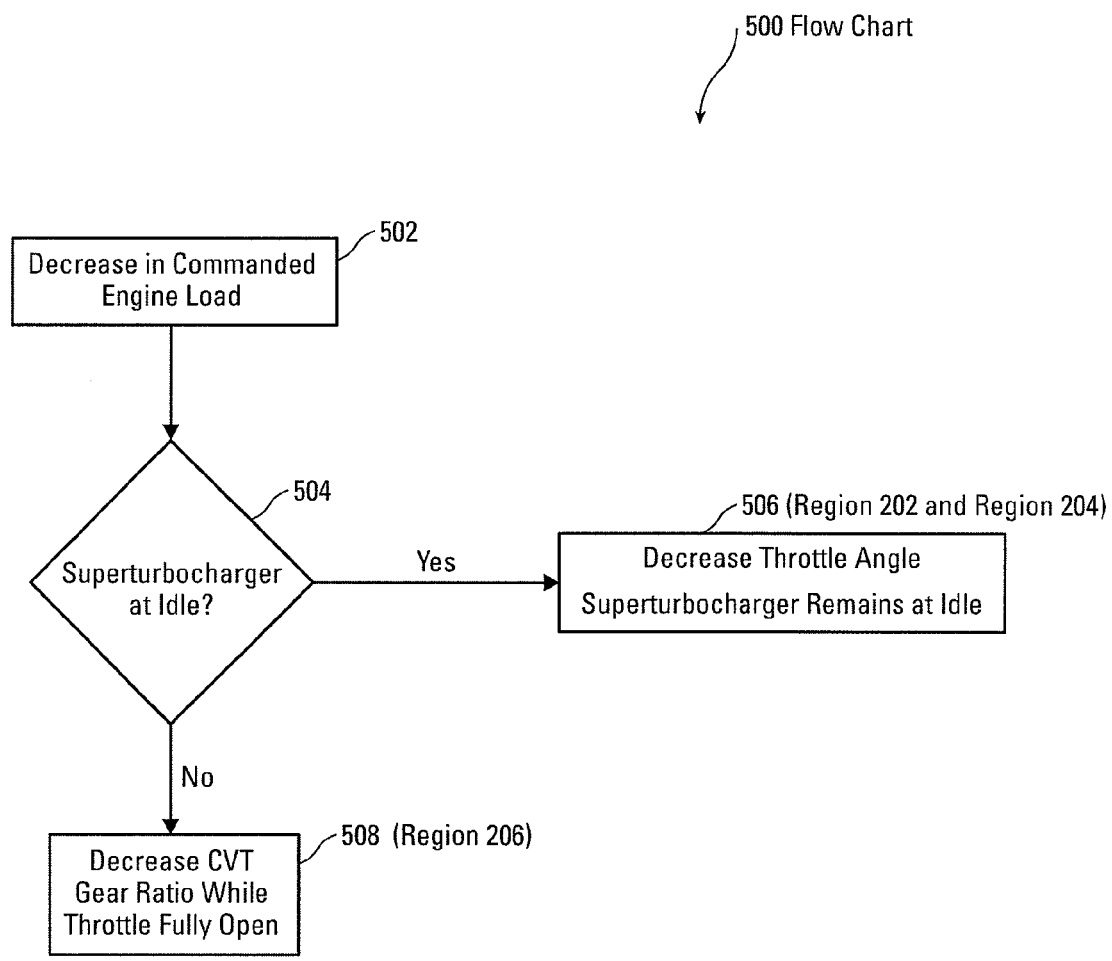
FIG. 5 is another flow chart of the operation of the superturbocharged engine system during decreasing engine load.

FIG. 5 is a flow chart 500 illustrating the operation of the superturbocharged engine system 100 in response to controller 126, when there is a decrease in the commanded engine load. As illustrated in FIG. 3, at step 502, a decrease in the engine load is detected. At step 504, it is determined whether the turbine is at idle or is operating at a low rotational speed. If so, the process proceeds to step 506. At step 506, the throttle angle is decreased and the turbine 110 remains at idle speed or at a speed that is producing turbocompounding. This occurs in region 202 and region 204. If it is determined, at step 504, that the turbine 110 is not operating at idle speed, the effective drive ratio of the continuously variable transmission 144 is decreased, while the throttle is in the open position. This occurs in region 206.

As noted above the remaining disclosure with respect to FIGS. 6-17 regards particular superturbocharger control systems that control the overall load of the superturbocharger/ engine system either without the need for throttling the engine or independent of the throttling of the engine (i.e., the throttle is held at a fixed position and the superturbocharger continuously variable transmission is used to control the overall system load).

Figure 6:
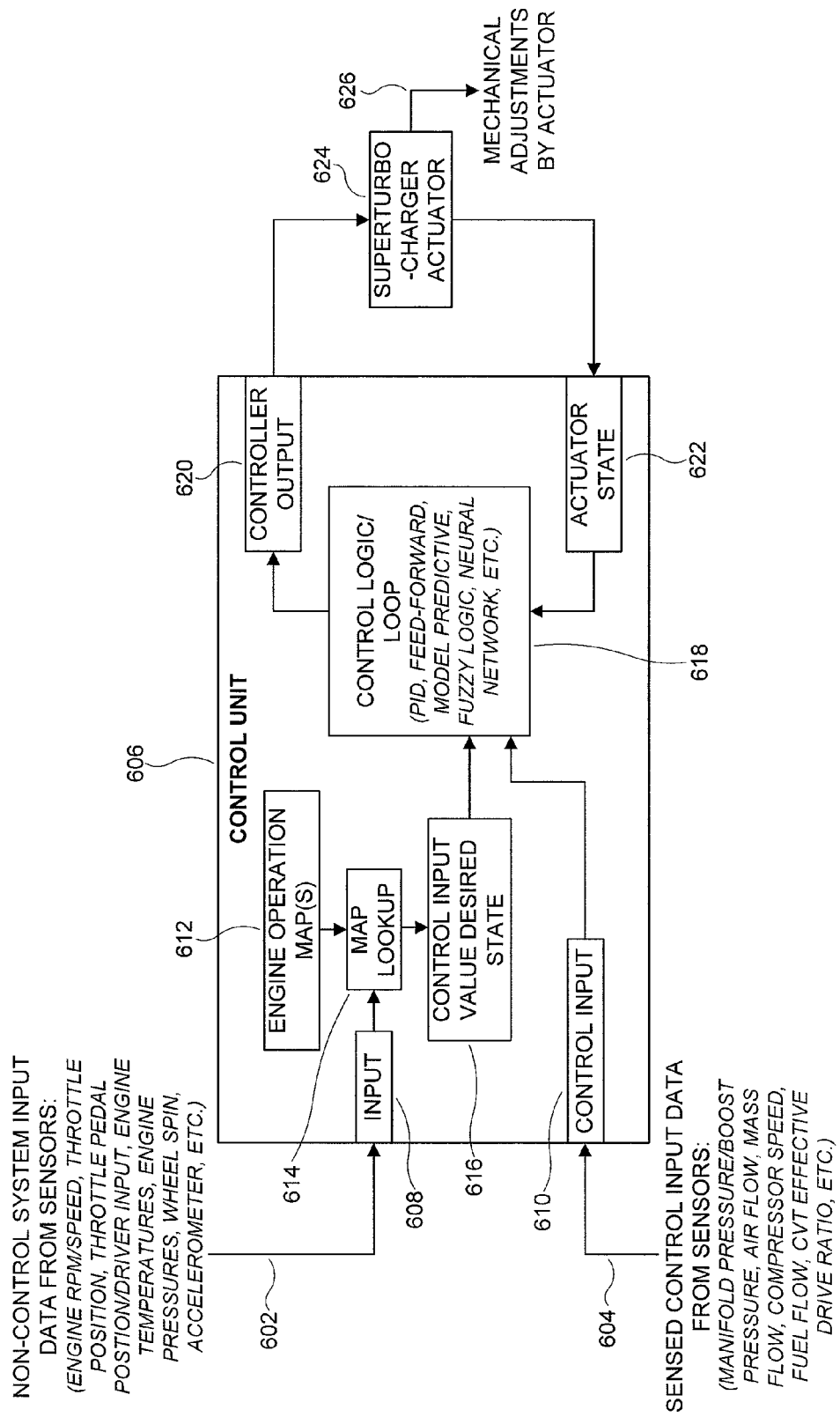
FIG. 6 is a block diagram of a control unit for an embodiment.

FIG. 6 is a block diagram 600 of a control unit 606 for an embodiment. Generally, the control unit 606 may have inputs 608 for non-control system input data 602 from sensors on the superturbocharged engine system. There may also be a control input 610 for the sensed/actual control input data 604 from sensors on the superturbocharged engine system. The control unit 606 may have a controller output 620 that sends an updated continuously variable transmission ratio (effective drive ratio) to the superturbocharger actuator 624, which, accordingly, implements the appropriate mechanical adjustments 626 to the superturbocharged engine system to cause the superturbocharged engine system to change the continuously variable transmission ratio to the updated continuously variable transmission ratio from the control unit 606. The superturbocharger actuator 624 may loop the current continuously variable transmission ratio at the actuator 624 back to the control unit 606 through an actuator state input 622 on the control unit 606. Various embodiments may, or may not, need the current actuator state 622 depending on how the control logic/loop 618 is implemented. However, even if the actuator state 622 is not needed for a particular control logic/loop 618, it may still be worthwhile to read the actuator state 622 to check for errors by ensuring that the updated continuously variable transmission ratio sent over the controller output 620 is actually being implemented by the actuator 624.

One skilled in the art will recognize that the control unit 606 may be implemented in a single physical electronic subsystem of the superturbocharged engine system, or as multiple electronic sub-systems communicating with each other as necessary to perform the various tasks of receiving data, conditioning/calculating data, sending data, looking up values in engine operation maps, and/or performing control logic/loop functions. For example, one embodiment may have the non-control data inputs 602/608 and the sensed/ actual control data input 604/610 feed into one physical subsystem that then performs the engine operation map(s) 612 look up operations and the calculation of a control input value error. Another sub-system may then perform the control logic/loop operations (e.g., Proportional Integrative Derivative—PID) to derive the updated continuously variable transmission ratio output 620 to send to the superturbocharger actuator 624. The described control unit is physically split between the control logic/loop 618 and subsystems 608, 610, 612, 614, 616 that generate a control input value error. The engine manufacturer (or another third party) may provide the control logic/loop 618 and the engine operation map(s) 612, while the remaining portions of the map look up 614 and error calculations for the control input value 604/610 may be implemented by the superturbocharger manufacturer providing the additional superturbocharger equipment to place on the engine. In a different embodiment, all of the functions may be performed by a single physical electronic sub-system. In yet another embodiment, each of the identified sections 608, 610, 612, 614, 616, 618, 620, 622 could potentially be performed by a separate physical sub-system, but that degree of separation may lead to difficulties in inter-sub-system communication and in practical matters of physical placement of the units on the superturbocharged engine system. As used herein, the control unit 606 is referenced as a single virtual entity with multiple sub-systems 608, 610, 612, 614, 616, 618, 620, 622 performing the operations of the control unit 606.

As a practical matter, the implementation of the physical aspects of the control unit 606 (implemented as either one physical sub-system or multiple physical subsystems) would likely be done with an embedded electronic/computer device with industrial components and without a graphical display device for a user. However, a graphical display device may be incorporated into a control panel or dashboard of a vehicle as desired by a system designer, but the operation of the control system does not require user interaction beyond potentially providing a desired load input (e.g., using a gas pedal for entering the desired load level of a vehicle). While a graphical display is not necessary, various embodiments may provide an output to permit a user and/or technician to view system operation for troubleshooting purposes. As the control unit 606 operates using the same principles as a standard computer, a standard, general purpose computer may be particularly programmed to perform the control functions described herein for the control unit 606.

Further, as described above, various embodiments may provide the control and management functions of the control unit 606 detailed herein via an application operating on a computer system (or other electronic devices). Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

Notably, the control unit 606 may perform the necessary control operations to meet the control requirements, including achieving the desired load independent of any throttling of the engine of the superturbocharger system. That is, if the engine has a throttle, the throttle may remain in a fixed position and the control unit 606 may adjust the continuously variable transmission ratio of the superturbocharger continuously variable transmission to control the load, and other aspects, of the superturbocharged engine system. Consequently, the system may operate without a throttle on the engine at all and the continuously variable transmission ratio providing all of the overall control of the load and any other aspects of the superturbocharged engine system that a user/system designer may desire to control.

The non-control input data 608 to the control unit 606 may be based on measurements from at least one superturbocharged engine system sensor 602. Further, each non-control input data value may be a calculation based off of one or more superturbocharged engine system sensors 602. For instance, a calculation might entail a conversion from English to metric units and/or metric to English units for a single sensed value. Another calculation might combine two sensed values such as an air/fuel ratio based off of an air flow sensor and a fuel flow sensor. A non-control data input 608 may be tied directly to a measurement from a sensor 602 without any need to perform any calculations. Different data inputs 608 may each be individually defined to either directly reflect a sensor measurement 602 or calculations based on at least one sensor measurement 602 such that both direct and calculated data inputs 608 may be used in the same system. Typically, there are at least two non-control data inputs 608 in order to facilitate a look up operation 614 of the desired control input value 616 for the current state of the non-control data inputs 608. In some cases, a more complex look up 614 may involve three or more data inputs 608 in order to properly correlate the current system operational state to the desired control input value 616. Some potential non-control data inputs 608 may include, but are not limited to: engine Revolutions Per Minute (RPM)/speed, throttle position, throttle pedal position/driver (user) input, engine temperatures, engine pressures, wheel spin, accelerometer, etc.

The control input 610 to the control unit 606 may also be based on measurements from at least one superturbocharged engine system sensor 604. While there is typically only one control input 610, the control input 610 may be a calculation based off of one or more superturbocharged engine system sensors 602. For instance, as for the non-control inputs 608, a calculation might entail a conversion from English to metric units and/or metric to English units for a single sensed value and/or might combine two sensed values such as an air/fuel ratio being based off of an air flow sensor and a fuel flow sensor. Similarly, the control data input 610 may be tied directly to a measurement from a sensor 604 without any need to perform any calculations. Some potential control data inputs 610 may include, but are not limited to: manifold pressure/boost pressure, air flow, mass flow, compressor speed, fuel flow, continuously variable transmission ratio, etc.

The engine operation map(s) 612 provide a correlation between the non-control inputs 608 and the control input 610 such that the control unit 606 may look up a desired control input value 616 and compare the desired control input value 616 to the actual/sensed control input 610 to obtain a control input value error for use by the control logic/loop 618 for adjusting the continuously variable transmission ratio of the superturbocharger system via the superturbocharger actuator 624. Typically the engine operation map(s) 612 are provided by the engine manufacturer as test data of the operational states of the system. Sometimes there may be multiple engine operation map(s) 612, but as used herein, the engine operation map(s) 612 are referred to as an engine operation map 612, which is meant to encompass the necessary engine maps 612 necessary to perform a particular look up 614 operation. A simple concept of an engine operation map 612 is that of a simple table with each of the non-control inputs 608 acting as axes for the table and each cell representing a desired control input value for the corresponding states of the non-control inputs 608. See the disclosure with respect to FIGS. 7B and 10B for an example of two inputs 608 that are used to look up 614 a desired control input value 616 on an engine operation map 612. While an engine operation map 612 may be provided as a table of entries as described above, engine operation maps may just as easily be created as one or more graph lines/curves of the necessary values, a function based on the non-control inputs 608, or any predefined relationship (prior to implementation of the control of the control unit 606) of the non-control inputs 608 to the desired control input value 616. In some cases, it may be possible that the non-control inputs correlate to multiple control values and the multiple control values may be the basis of a calculation to an end control value, such as various values like boost pressure, fuel flow, and air flow providing values for a calculation of an engine load.

The control logic/loop 618 provides for the conversion of the error/difference between the desired 616 and actual/sensed 610 control input value into an updated continuously variable transmission ratio controller output 620 to the superturbocharger actuator 624. Many times the control logic/loop 618 sub-system may be supplied by a third party to the superturbocharged engine system, such as the engine manufacturer of the engine used in the system. There are many types of control logic/loop 616 systems/paradigms that may be used to provide the control logic/loop 618 for the control input value error. Some of the potential control logic/loop 618 implementations include, but are not limited to: PID, feed-forward, model predictive, fuzzy logic, neural network, etc. Further, some control logic/loop 618 implementations may combine types such as a fuzzy logic PID implementation. In some cases the control logic/loop 618 may utilize the current continuously variable transmission ratio actuator state 622 as part of the control logic/loop 618 implementation. For instance, the PID implementation disclosed with respect to FIG. 9 below calculates a change to the continuously variable transmission ratio which is then summed with the current continuously variable transmission ratio to reach the updated continuously variable transmission ratio. If the current continuously variable transmission ratio is not required, as stated above, the control logic/loop 620 may utilize the current continuously variable transmission ratio actuator state 622 as a means of error checking to ensure the actuator is moving as ordered by the control logic/loop 618 via the controller output 620. As one skilled in the art will understand, the control unit 606 and the associated control logic/loop 618 continuously sample and perform the calculations in real-time to provide real-time control of the superturbocharged engine system.

The controller output 620 sends the resulting updated continuously variable transmission ratio to the superturbocharger actuator 624 so that the actuator 624 will provide the mechanical adjustments to change the continuously variable transmission ratio of the superturbocharged engine system to the updated continuously variable transmission ratio from the control logic/loop 618. The communication from/to the superturbocharger actuator 624 may be any communication protocol supported by both the actuator 624 and the control unit 606. One common type of communication system is a Pulse Width Modulated (PWM) electronic signal. Other types of communication protocols may include, but are not limited to: pneumatic communications, field bus type control network protocols, other standard and/or proprietary communication protocols (such as HART—Highway Addressable Remote Transducer protocol, CAN—Controller Area Network protocol, and numerous other communication protocols).

FIG. 7A is a diagram 700 of the operation of a two input 702, 704 controller for an embodiment. The embodiment 700 shown in FIG. 7A provides a basic example of a system with two data inputs 702, 704 and a control input value 710 that permits ease of understanding without the additional complications of calculations, etc. as described in the disclosure with respect to FIG. 8 below. A first data input obtained directly from system sensors 702 and a second data input 704 obtained directly from system sensors are used in a look up operation 706 on the engine operation map to obtain the desired control input value 708 for the specific values of the first 702 and second 704 input data values that are used to define the current operational status of the superturbocharged engine system. At 712, the control input value error 714 may be calculated as a difference between the engine operation map look up 706 desired control input value 708 and the actual/measured control input value 710. The control input value error 714 may then be fed to the control logic/loop 718 that converts the control input value error 714 into an updated continuously variable transmission ratio 720 that may then be sent to the superturbocharger actuator 720 to perform the mechanical operations to change the continuously variable transmission ratio at the continuously variable transmission. The actual/current continuously variable transmission ratio may be delivered to the control logic/loop 718 if needed as part of the operation to define the updated continuously variable transmission ratio 720 or as a trouble shooting mechanism to ensure the updated continuously variable transmission ratio 720 is being properly delivered to and implemented by the superturbocharger actuator.

FIG. 7B is a conceptual diagram 750 of an example process for obtaining a desired control input value 708 from a table characterizing a two input 702, 704 data value engine operation map 756 for an embodiment. As stated above, the engine operation map 756 may be delivered in a variety of forms, but the easiest to present is a table 756 where the defined cell 708 provides the desired control input value 708 for the current values of the first 702 and second 704 data input values. In the table 756, one axis 752 describes the possible values for the first input data value 702 and the other axis 754 describes the possible values for the second input data value 704. The current sensed first input data value 702 defines the location on the first axis 752 and the second input data value 704 defines the location on the second axis 754, resulting in defining the cell 708 of the table 756 having the desired control input value 708 for the current operation of the superturbocharged engine system as defined by the first 702 and second 704 data input values.

Figure 8:
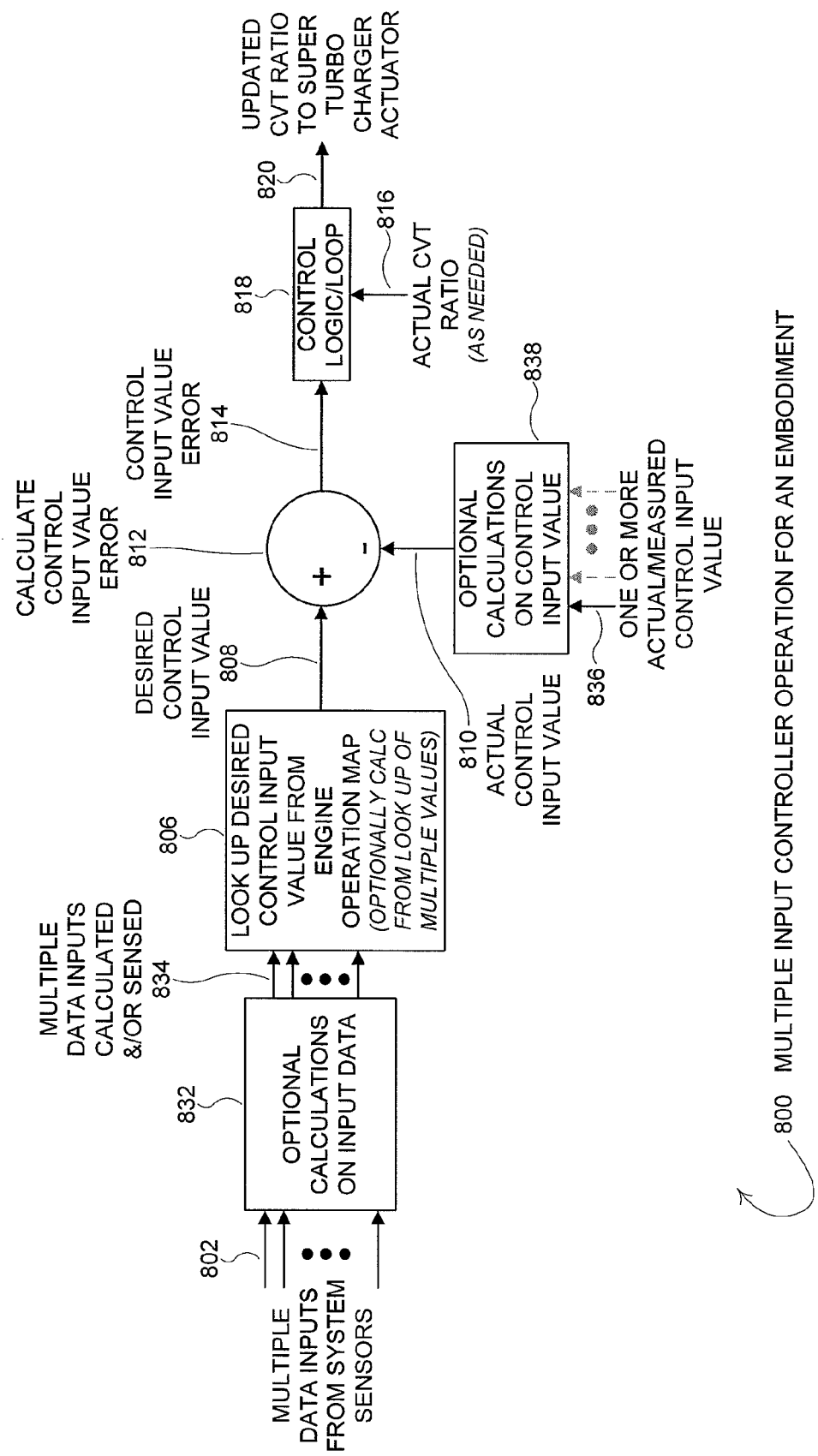
FIG. 8 is a diagram of the operation of a multiple input controller for an embodiment.

FIG. 8 is a diagram 800 of the operation of a multiple input 802 controller for an embodiment. A corresponding figure describing a conceptual table is not provided for the multiple input 802 controller shown in FIG. 8 as it is difficult to show a table with more than 2 or 3 dimensions (i.e., more than 2 or 3 data inputs 802) as a drawing. The embodiment 800 shown in FIG. 8 provides a more complex example of a system with multiple data inputs 802, optional data calculations 832, and a potentially calculated 838 control input value 810 that presents many of the potential complexities in a drawing 800. Multiple data inputs (two to as many as needed to define system operation) are from system sensors 802. Some of the data inputs 834 may be delivered directly as sensed 802, however, some data inputs 834 may be the result of optional calculations 832 of one sensed value 802 (e.g., unit conversion) and/or a value based on two or more sensed values 802 (e.g., air/fuel ratio). The multiple sensed and/or calculated data input values 834 may then be are used in a look up operation 806 on the engine operation map to obtain the desired control input value 808 for the specific values of the multiple calculated and/or sensed data input values 834. In some embodiments, the desired control input value 808 may be a function of multiple values from the engine operation map rather than a direct look up of the desired control input value 808 (e.g., engine load may result from multiple pressure and flow values obtained from the engine operation map). At 812, the control input value error 814 is calculated as a difference between the engine operation map look up 806 desired control input value 808 and the actual/measured control input value 810. In the more complex system 800 shown in FIG. 8, the actual/measured control input value 810 may also be the result of calculations 838 performed on one or more sensed values 836, such as an air/fuel ratio being based on the sensed values from an air flow sensor and a fuel flow sensor. The control input value error 814 may then be fed to the control logic/loop 818 that converts the control input value error 814 into an updated continuously variable transmission ratio 820 that may then be sent to the superturbocharger actuator 820 to perform the mechanical operations to change the continuously variable transmission ratio at the continuously variable transmission. The actual/current continuously variable transmission ratio may be delivered to the control logic/loop 818 if needed as part of the operation to define the updated continuously variable transmission ratio 820 or as a trouble shooting mechanism to ensure the updated continuously variable transmission ratio 820 is being properly delivered to and implemented by the superturbocharger actuator.

Figure 9:
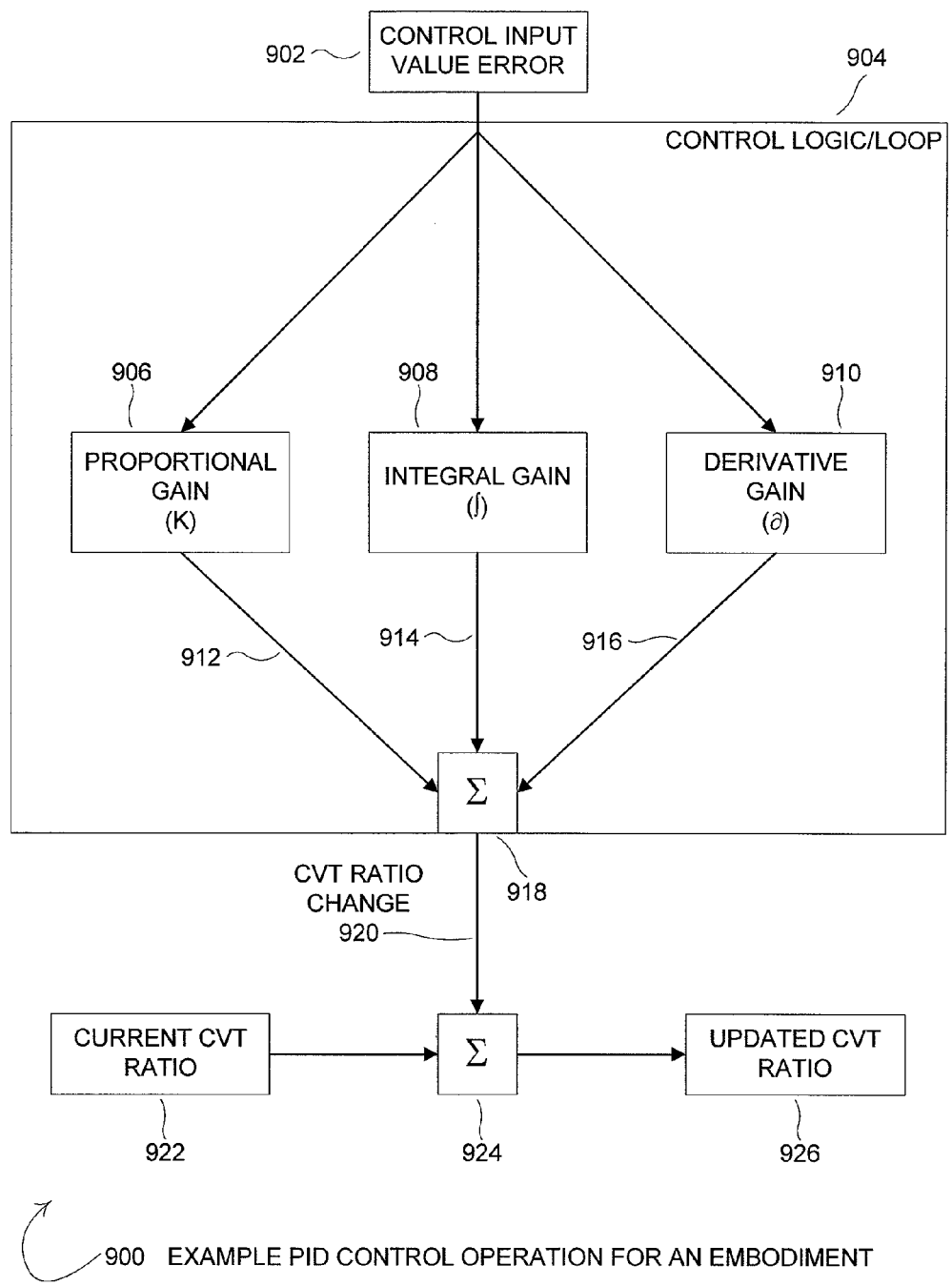
FIG. 9 is an example diagram of a Proportional Integrative Derivative (PID) control logic operation for an embodiment.

FIG. 9 is an example diagram 900 of a Proportional Integrative Derivative (PID) control logic 904 operation for an embodiment. The control logic/loop 904 of the PID control logic 904 receives the control input value error 902 and separately operates on the control input value error 902 using a proportional portion 912 with a proportional gain (k) 906, an integrative portion 914 having an integral gain/function 908, and a derivative portion 916 have a derivative gain/function 910. Via the separate gains 906-910, it may be possible to remove each one of the portions of the PID control logic/loop 904 by using a zero gain 906-910. At summation block 918, the separate proportional 912, integrative 914, and derivative 916 portions of the PID control logic/loop 904 may be added together to obtain a change in the continuously variable transmission ratio value 920. As the value is a "change" in the continuously variable transmission ratio 920, to get the full updated continuously variable transmission ratio value 926, a second summation block 924 may sum the continuously variable transmission ratio change 920 from the PID control logic/loop 904 with the current continuously variable transmission ratio 922 from the superturbocharger actuator in order to calculate the complete updated continuously variable transmission ratio 926.

FIG. 10A is a diagram 1000 of the operation of an air flow or mass flow 1010 controller for an embodiment. The embodiment 1000 shown in FIG. 10A provides a relatively basic non-theoretical example of a system with two data inputs 1002, 1004 (engine speed 1002 and desired load 1004) and a control input value 1010 (air flow or mass flow 1010) that permits ease of understanding without the additional complications of calculations. An engine speed data input obtained directly from system sensors 1002 and a desired load data input 1004 obtained directly from system sensors are used in a look up operation 1006 on the engine operation map to obtain the desired air flow or mass flow value 1008 for the specific operational status defined by the values of the engine speed sensor 1002 and the desired load sensor 1004 input data values for the superturbocharged engine system. At 1012, the control input value error 1014 may be calculated as a difference between the engine operation map look up 1006 desired air flow or mass flow value 1008 and the actual/measured air flow or mass flow value 1010. The air flow or mass flow error 1014 may then be fed to the control logic/loop 1018 that converts the air flow or mass flow error 1014 into an updated continuously variable transmission ratio 1020 that may then be sent to the superturbocharger actuator 1020 to perform the mechanical operations to change the continuously variable transmission ratio at the continuously variable transmission. The actual/current continuously variable transmission ratio may be delivered to the control logic/loop 1018 if needed as part of the operation to define the updated continuously variable transmission ratio 1020 or as a trouble shooting mechanism to ensure the updated continuously variable transmission ratio 1020 is being properly delivered to and implemented by the superturbocharger actuator.

FIG. 10B is a conceptual diagram 1050 of the non-theoretical example process for obtaining a desired air flow or mass flow control input value 1008 from a table characterizing a two input (engine speed 1002 and desired load 1004) data value engine operation map 1056 for an embodiment. As stated above, the engine operation map 1056 may be delivered in a variety of forms, but the easiest to present is a table 1056 where the defined cell 1008 provides the desired air flow or mass flow value 1008 for the current values of the engine speed 1002 and desired load 1004 data input values. In the table 1056, one axis 1052 describes the possible values for the engine speed 1002 and the other axis 1054 describes the possible values for the desired load 1004. The current sensed engine speed 1002 defines the location on the first axis 1052 and the current desired lad 1004 defines the location on the second axis 1054, resulting in defining the cell 1008 of the table 1056 having the desired control input value 1008 for the current operation of the superturbocharged engine system as defined by the engine speed 1002 and desired load 1004 data input values. Since the table 1056 of FIG. 10 is simply a conceptual exercise given as an example of one way an engine operation map may return a value, and other maps will be able to be characterized in a similar fashion, the remainder of the embodiments described will not include a separate table 1056 example for the specific embodiment as one skilled in the art will should understand the concepts in the engine operation map look up operation 1006 based on the disclosure with respect to this FIG. 10B and above for FIG. 7B.

Further, controlling for mass flow may help achieve emissions requirements where the amount of Exhaust Gas Recirculation (EGR) and the amount of air mixed together define an air/fuel ratio within the engine and the superturbocharger speed may be controlled to deliver a particular mass flow a pressure where mass flow is achieved.

FIG. 11 is a diagram 1100 of the operation of a compressor efficiency controller for an embodiment. The embodiment 1100 shown in FIG. 11 provides an example of a system with three data inputs 1102, 1104, 1122 (engine speed 1102, intake air flow 1104 and compressor differential pressure 1122) and a control input value 1110 (compressor speed 1110). An engine speed data input obtained directly from system sensors 1102, an intake air flow data input 1104 obtained directly from system sensors, and a compressor differential data input 1122 obtained directly from system sensors are used in a look up operation 1106 (a three-dimensional look up operation 1106) on the engine operation map embodied as a compressor efficiency map in order to obtain the desired compressor speed value 1108 for the specific operational status defined by the values of the engine speed sensor 1102, the intake air flow sensor 1104, and the compressor pressure differential sensor 1122 input data values for the superturbocharged engine system. At 1112, the control input value error 1114 may be calculated as a difference between the compressor efficiency map look up 1106 desired compressor speed value 1108 and the actual/measured compressor speed value 1110. The compressor speed error 1114 may then be fed to the control logic/loop 1118 that converts the compressor speed error 1114 into an updated continuously variable transmission ratio 1120 that may then be sent to the superturbocharger actuator 1120 to perform the mechanical operations to change the continuously variable transmission ratio at the continuously variable transmission. The actual/current continuously variable transmission ratio may be delivered to the control logic/loop 1118 if needed as part of the operation to define the updated continuously variable transmission ratio 1120 or as a trouble shooting mechanism to ensure the updated continuously variable transmission ratio 1120 is being properly delivered to and implemented by the superturbocharger actuator.

Additionally, an embodiment may control the speed of the superturbocharger 1110 such that the system is at a condition of maximum compressor efficiency for flow and pressure level requirements of the engine at a given operating condition. Utilizing the most efficient compressor speed for a given operating condition may result in allowing a minimum amount of energy to be put into the compressor to supply sufficient air flow to engine for meeting a desired load or emissions level. Operating to maximize the compressor efficiency should leave the most energy left over from the turbine to be added back onto the crankshaft of the engine. Maximum compressor efficiency control may vary the air/fuel ratio of the engine to provide the exact load as the amount of air supplied may be defined by the maximum efficiency point on the compressor efficiency map. The compressor efficiency map 1106 may be used to shift the superturbocharger speed 1110 in order to operate the compressor at the most efficient compressor operating speed possible, which still allows enough air flow to reach the load level required. An additional consideration for compressor efficiency control is inclusion of a bleed-off valve between the compressor outlet and engine entrance to avoid surge line of the compressor at low engine speed and high engine load (indicating low mass flow and a high pressure ratio within the compressor). For conditions with a danger of surge, the bleed-off valve may be opened to cause the mass flow through the compressor to become larger since, to achieve a high pressure ratio and with the high pressure ratio a sufficient mass flow for the engine, the compressor should run with a certain speed, which may lead into the surge if the mass flow through the compressor is too small.

Figure 12:
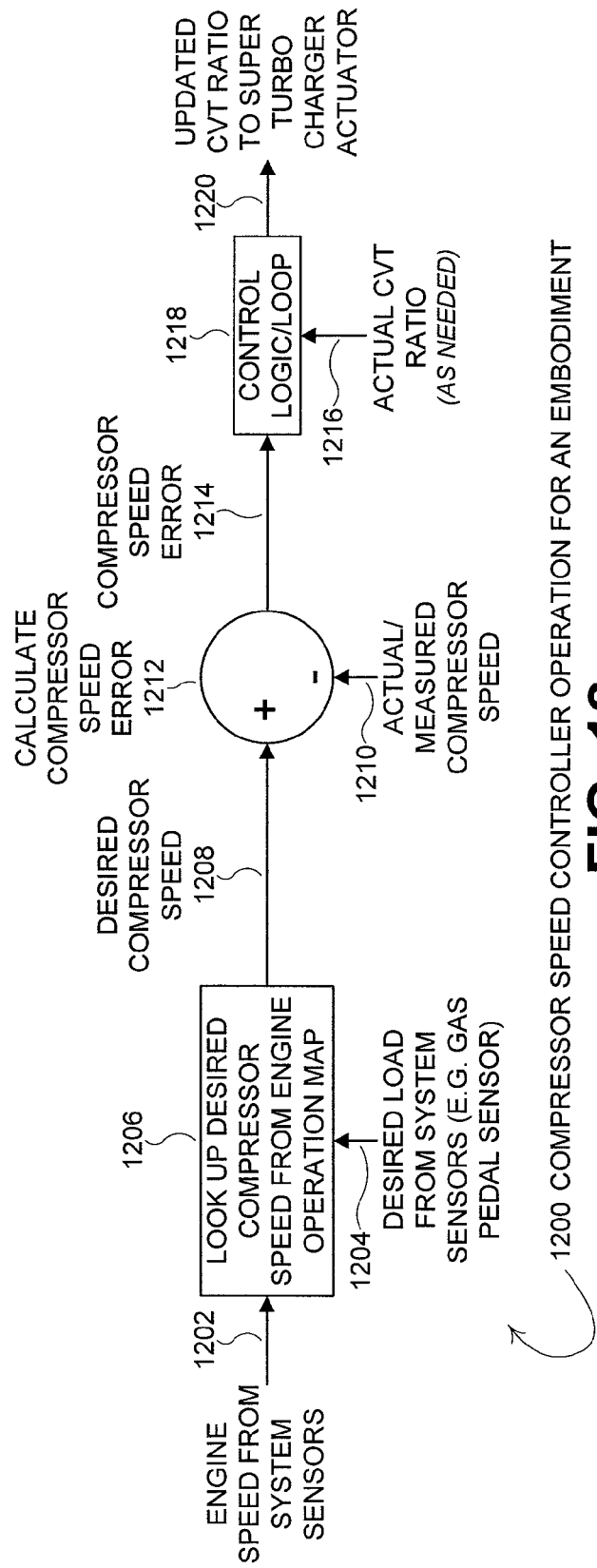
FIG. 12 is a diagram of the operation of a compressor speed controller for an embodiment.

FIG. 12 is a diagram 1200 of the operation of a compressor speed controller for an embodiment. The embodiment 1200 shown in FIG. 12 provides an example of a system with two data inputs 1202, 1204 (engine speed 1202 and desired load 1204) and a control input value 1210 (compressor speed 1210). An engine speed data input obtained directly from system sensors 1202 and a desired load data input 1204 obtained directly from system sensors are used in a look up operation 1206 on the engine operation map in order to obtain the desired compressor speed value 1208 for the specific operational status defined by the values of the engine speed sensor 1202 and the desired load sensor 1204 input data values for the superturbocharged engine system. At 1212, the control input value error 1214 may be calculated as a difference between the engine operation map look up 1206 desired compressor speed value 1208 and the actual/measured compressor speed value 1210. The compressor speed error 1214 may then be fed to the control logic/loop 1218 that converts the compressor speed error 1214 into an updated continuously variable transmission ratio 1220 that may then be sent to the superturbocharger actuator 1220 to perform the mechanical operations to change the continuously variable transmission ratio at the continuously variable transmission. The actual/current continuously variable transmission ratio may be delivered to the control logic/loop 1218 if needed as part of the operation to define the updated continuously variable transmission ratio 1220 or as a trouble shooting mechanism to ensure the updated continuously variable transmission ratio 1220 is being properly delivered to and implemented by the superturbocharger actuator.

Further, simply controlling the speed of the compressor and turbine based on an engine operation map may separate the speed control from the most efficient speed in that the speed of the compressor may be defined by a target on the engine operation map where it is desired to operate in order to achieve emissions levels or other defining parameters that may determine an optimal operating point for the engine. By driving the superturbocharger to the identified specific speed, the desired air flow may be met to achieve the emissions target for a particular operating condition. Also, a system may have an ability to detect speed of the compressor and turbine without a potentially expensive high speed sensor because of the connection between the transmission (CVT) output and the high speed section, which may permit speed detection at the lower speed section with a lower cost lower speed sensor.

Figure 13:
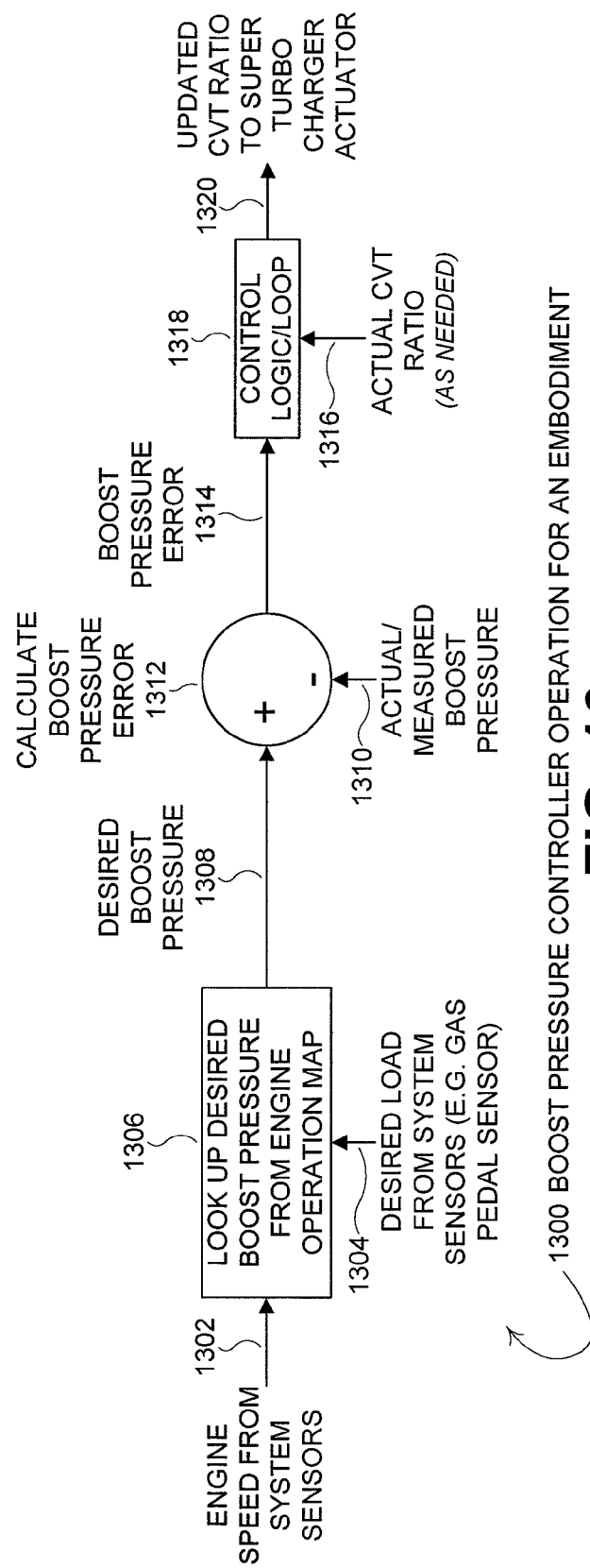
FIG. 13 is a diagram of the operation of a boost pressure controller for an embodiment.

FIG. 13 is a diagram 1300 of the operation of a boost pressure controller for an embodiment. The embodiment 1300 shown in FIG. 13 provides an example of a system with two data inputs 1302, 1304 (engine speed 1302 and desired load 1304) and a control input value 1310 (boost pressure 1310). An engine speed data input obtained directly from system sensors 1302 and a desired load data input 1304 obtained directly from system sensors are used in a look up operation 1306 on the engine operation map in order to obtain the desired boost pressure value 1308 for the specific operational status defined by the values of the engine speed sensor 1302 and the desired load sensor 1304 input data values for the superturbocharged engine system. At 1312, the control input value error 1314 may be calculated as a difference between the engine operation map look up 1306 desired boost pressure value 1308 and the actual/measured boost pressure value 1310. The boost pressure error 1314 may then be fed to the control logic/loop 1318 that converts the boost pressure error 1314 into an updated continuously variable transmission ratio 1320 that may then be sent to the superturbocharger actuator 1320 to perform the mechanical operations to change the continuously variable transmission ratio at the continuously variable transmission. The actual/current continuously variable transmission ratio may be delivered to the control logic/loop 1318 if needed as part of the operation to define the updated continuously variable transmission ratio 1320 or as a trouble shooting mechanism to ensure the updated continuously variable transmission ratio 1320 is being properly delivered to and implemented by the superturbocharger actuator.

Furthermore, boost pressure control may base a driver's request of engine performance on how far the driver depresses a gas pedal, without actually adjusting a throttle. The load request may be translated into a boost request such that the system operates to a particular boost pressure. The boost pressure control functions very well over wide speed conditions where the boost level may be maintained by shifting the transmission (continuously variable transmission) and the turbo speed is varied in order to maintain the boost requested by an operator or the controller. Simply stated, the boost pressure control simply has the boost pressure input 1310 in the superturbocharger controller and the superturbocharger controller may cause the actuator 1320 to actuate to a speed that meets the boost pressure request.

Figure 14:
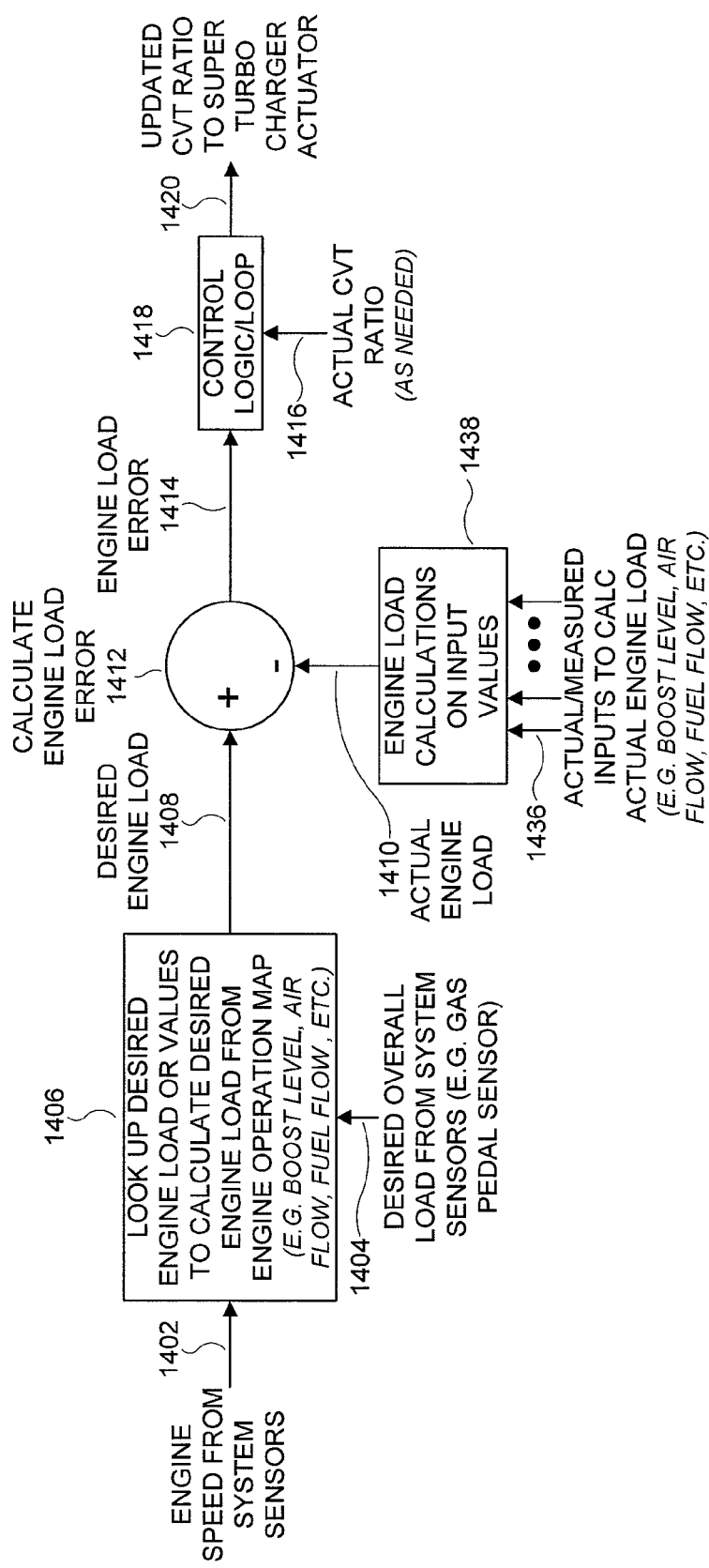
FIG. 14 is a diagram of the operation of an engine load controller for an embodiment.

FIG. 14 is a diagram 1400 of the operation of an engine load controller for an embodiment. The embodiment 1400 shown in FIG. 14 provides an example of a system with two data inputs 1402, 1404 (engine speed 1402 and desired load 1404) and a control input value 1410 (engine load 1410) plus calculations 1438 on sensed inputs 1436 to calculate the actual engine load 1410. An engine speed data input obtained directly from system sensors 1402 and a desired load data input 1404 obtained directly from system sensors are used in a look up operation 1406 on the engine operation map in order to obtain the desired engine load value 1408 for the specific operational status defined by the values of the engine speed sensor 1402 and the desired load sensor 1404 input data values for the superturbocharged engine system. If the engine operation map does not contain a specific engine load value, the look up operation may look up multiple values that may be used to calculate the desired engine load 1408 similar to the calculation for the actual engine load 1410. Both the actual engine load 1410 and the looked up 1406 engine load 1408 calculations may be based on similar parameters, including, but not limited to: boost level, air flow, fuel flow, etc. At 1412, the control input value error 1414 may be calculated as a difference between the engine operation map look up 1406 desired engine load value 1408 and the actual engine load value 1410. The engine load error 1414 may then be fed to the control logic/loop 1418 that converts the engine load error 1414 into an updated continuously variable transmission ratio 1420 that may then be sent to the superturbocharger actuator 1420 to perform the mechanical operations to change the continuously variable transmission ratio at the continuously variable transmission. The actual/current continuously variable transmission ratio may be delivered to the control logic/loop 1418 if needed as part of the operation to define the updated continuously variable transmission ratio 1420 or as a trouble shooting mechanism to ensure the updated continuously variable transmission ratio 1420 is being properly delivered to and implemented by the superturbocharger actuator.

Additionally, an engine model may define a map of engine speed and load based on the current operating conditions such as boost level, air flow, and fuel flow. For a given engine speed and desired overall load, the controller may command a continuously variable transmission effective drive ratio that achieves the map-given operating conditions of boost, air flow, etc. Where the superturbocharger and the superturbocharger boost are specifically defined based on and engine model (engine operation map) to essentially achieve a particular load level of the engine, the engine load control may be done simply with a torque or load engine model of the engine (for the engine operation map) and driving the boost level that achieves the load for the particular engine speed.

Figure 15:
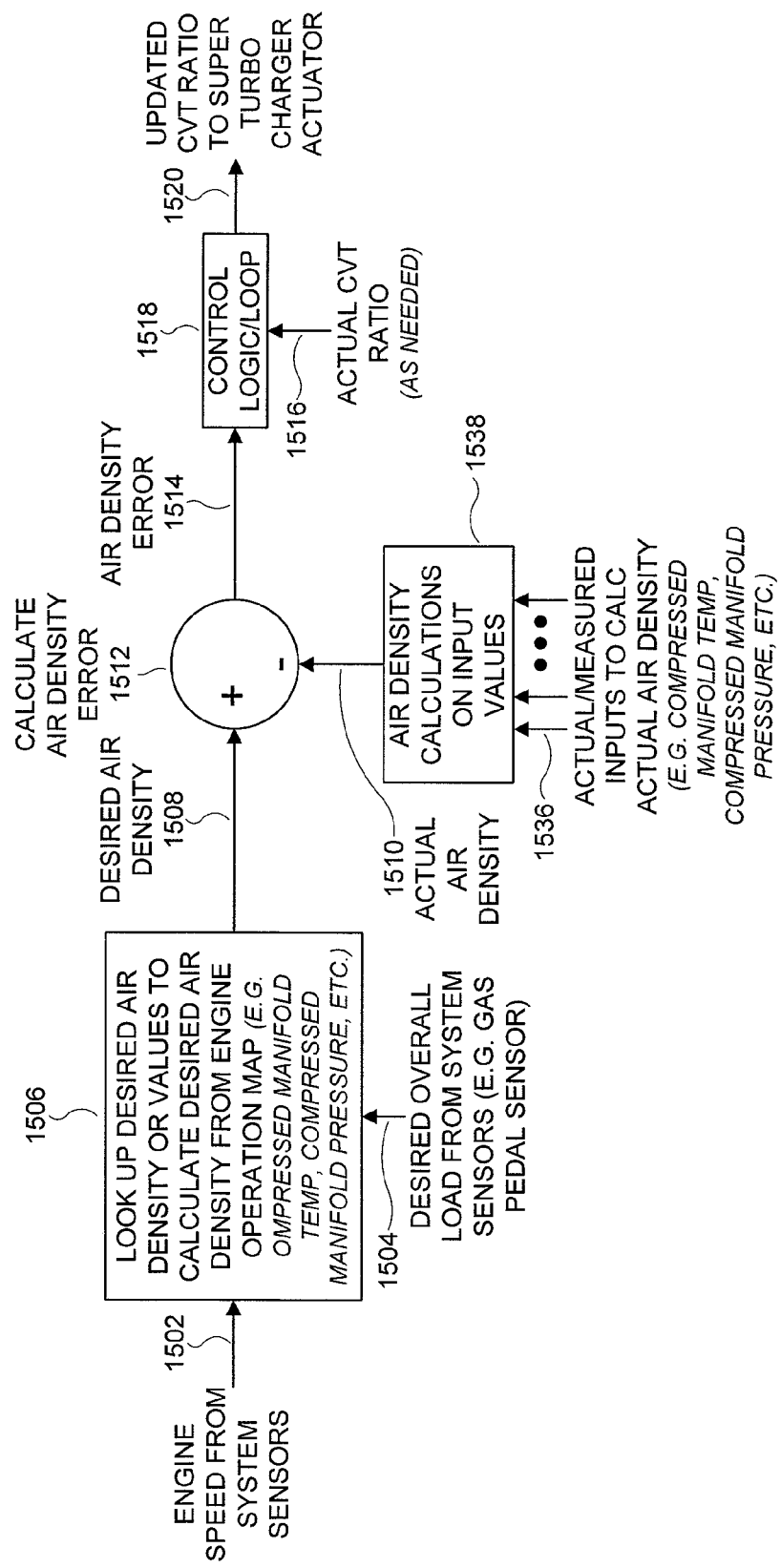
FIG. 15 is a diagram of the operation of an air density controller for an embodiment.

FIG. 15 is a diagram 1500 of the operation of an air density controller for an embodiment. The embodiment 1500 shown in FIG. 15 provides an example of a system with two data inputs 1502, 1504 (engine speed 1502 and desired load 1504) and a control input value 1510 (air density 1510) plus calculations 1538 on sensed inputs 1536 to calculate the actual air density 1510. An engine speed data input obtained directly from system sensors 1502 and a desired load data input 1504 obtained directly from system sensors are used in a look up operation 1506 on the engine operation map in order to obtain the desired engine load value 1508 for the specific operational status defined by the values of the engine speed sensor 1502 and the desired load sensor 1504 input data values for the superturbocharged engine system. If the engine operation map does not contain a specific air density value, the look up operation may look up multiple values that may be used to calculate the desired air density 1508 similar to the calculation for the actual air density 1510. Both the actual air density 1510 and the looked up 1506 air density 1508 calculations may be based on similar parameters, including, but not limited to: compressed manifold temperature, compressed manifold pressure, etc. At 1512, the control input value error 1514 may be calculated as a difference between the engine operation map look up 1506 desired air density value 1508 and the actual air density value 1510. The air density error 1514 may then be fed to the control logic/loop 1518 that converts the air density error 1514 into an updated continuously variable transmission ratio 1520 that may then be sent to the superturbocharger actuator 1520 to perform the mechanical operations to change the continuously variable transmission ratio at the continuously variable transmission. The actual/current continuously variable transmission ratio may be delivered to the control logic/loop 1518 if needed as part of the operation to define the updated continuously variable transmission ratio 1520 or as a trouble shooting mechanism to ensure the updated continuously variable transmission ratio 1520 is being properly delivered to and implemented by the superturbocharger actuator.

Further, the pressure and temperature of the compressed manifold air gives an approximate density of the mixture going into the engine. The density control may be utilized to define the speed to which the superturbocharger is shifted to achieve the desired air density 1508 being requested of the mixture going into the engine. Thus, the air density control may better take into account varying ambient pressures and temperatures of the atmosphere and compensate by giving the engine a specific amount of air to generate power as determined by the density of the air in the intake manifold after the superturbocharger.

Figure 16:
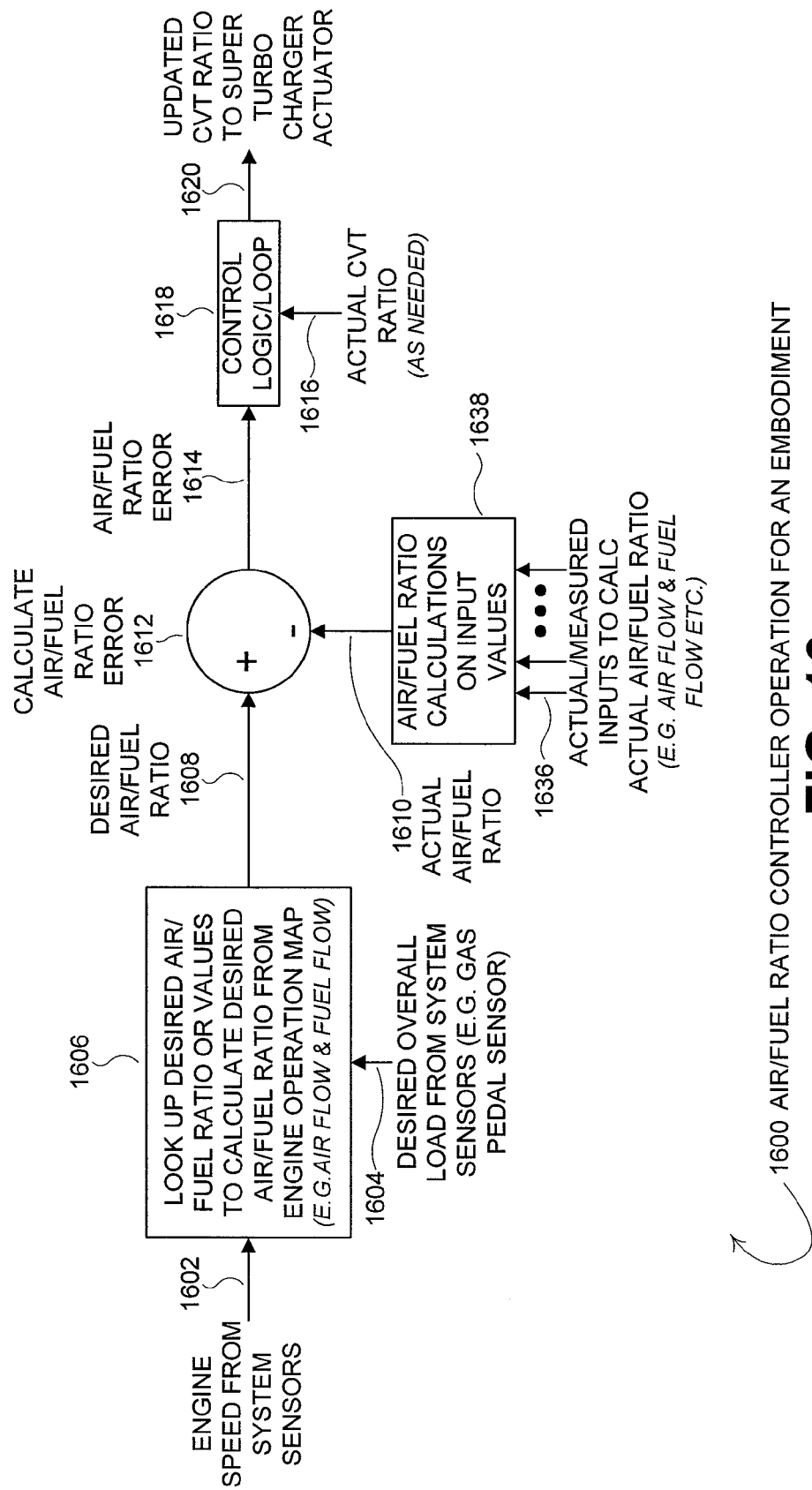
FIG. 16 is a diagram of the operation of an air/fuel ratio controller for an embodiment.

FIG. 16 is a diagram 1600 of the operation of an air/fuel ratio controller for an embodiment. The embodiment 1600 shown in FIG. 16 provides an example of a system with two data inputs 1602, 1604 (engine speed 1602 and desired load 1604) and a control input value 1610 (air/fuel ratio 1610) plus calculations 1638 on sensed inputs 1636 to calculate the actual air/fuel ratio 1610. An engine speed data input obtained directly from system sensors 1602 and a desired load data input 1604 obtained directly from system sensors are used in a look up operation 1606 on the engine operation map in order to obtain the desired engine load value 1608 for the specific operational status defined by the values of the engine speed sensor 1602 and the desired load sensor 1604 input data values for the superturbocharged engine system. If the engine operation map does not contain a specific air/fuel ratio value, the look up operation may look up multiple values that may be used to calculate the desired air/fuel ratio 1608 similar to the calculation for the actual air/fuel ratio 1610. Both the actual air/fuel ratio 1610 and the looked up 1606 air/fuel ratio 1608 calculations may be based on similar parameters, including, but not limited to: air flow and fuel flow. At 1612, the control input value error 1614 may be calculated as a difference between the engine operation map look up 1606 desired air/fuel ratio value 1608 and the actual air/fuel ratio value 1610. The air/fuel ratio error 1614 may then be fed to the control logic/loop 1618 that converts the air/fuel ratio error 1614 into an updated continuously variable transmission ratio 1620 that may then be sent to the superturbocharger actuator 1620 to perform the mechanical operations to change the continuously variable transmission ratio at the continuously variable transmission. The actual/current continuously variable transmission ratio may be delivered to the control logic/loop 1618 if needed as part of the operation to define the updated continuously variable transmission ratio 1620 or as a trouble shooting mechanism to ensure the updated continuously variable transmission ratio 1620 is being properly delivered to and implemented by the superturbocharger actuator.

In addition, the engine load may be determined by the amount of fuel flow to the injectors, and a given air/fuel ratio may be desired for given operating conditions of the engine. The air/fuel ratio may be measured by determining the fuel flow as well as the air flow to the engine. The measured air and fuel flow parameters may then be used by the superturbocharger controller to shift the superturbocharger to a continuously variable transmission ratio that operates the superturbocharged engine system to the desired air/fuel ratio. The shifting/speed control for the continuously variable transmission may be utilized to meet the target (i.e., desired) 1608 air/fuel ratio. A sensor measuring the amount of air flow or pressure and temperature may be utilized to calculate the air/fuel ratio 1610 and/or the air/fuel ratio target 1608. The superturbocharger continuously variable transmission may then be shifted to achieve the amount of air flow necessary for the air/fuel ratio target.

Figure 17:
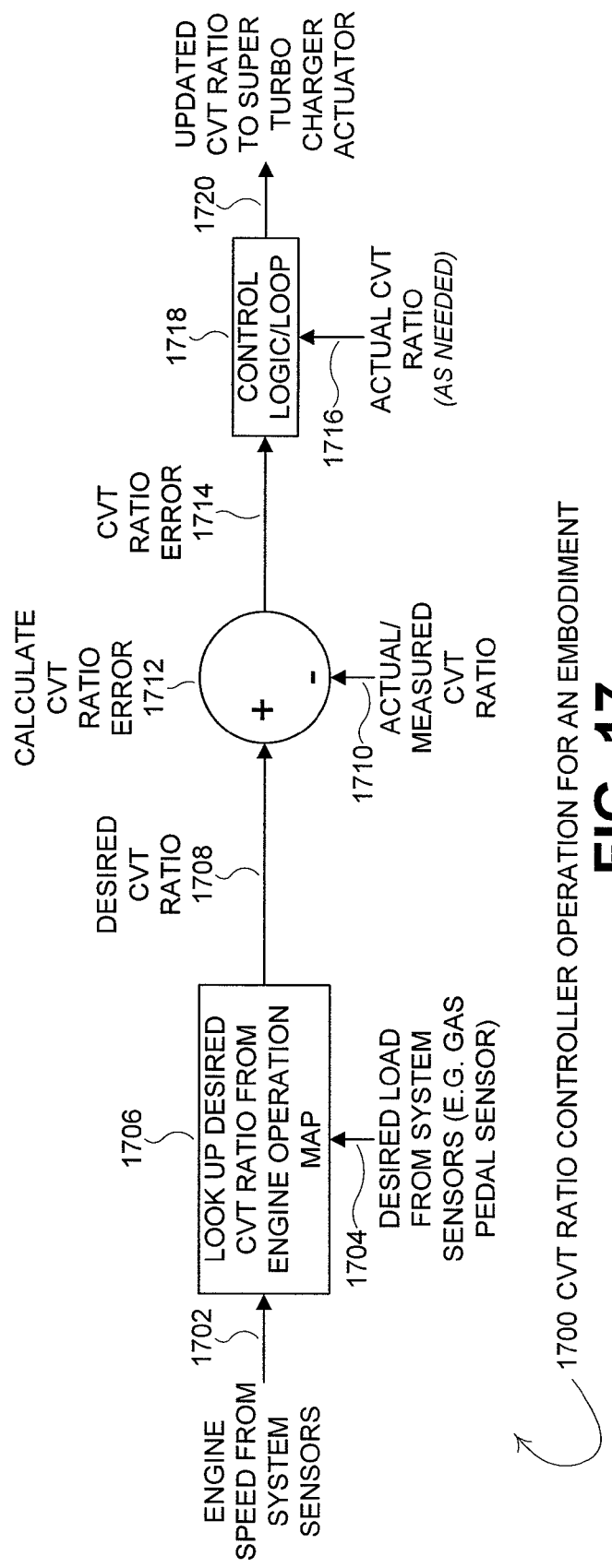
FIG. 17 is a diagram of the operation of a Continuously Variable Transmission (CVT) ratio controller for an embodiment.

FIG. 17 is a diagram 1700 of the operation of a Continuously Variable Transmission (CVT) ratio controller for an embodiment. The embodiment 1700 shown in FIG. 17 provides an example of a system with two data inputs 1702, 1704 (engine speed 1702 and desired load 1704) and a control input value 1710 (continuously variable transmission ratio 1710). An engine speed data input obtained directly from system sensors 1702 and a desired load data input 1704 obtained directly from system sensors are used in a look up operation 1706 on the engine operation map in order to obtain the desired continuously variable transmission ratio value 1708 for the specific operational status defined by the values of the engine speed sensor 1702 and the desired load sensor 1704 input data values for the superturbocharged engine system. At 1712, the control input value error 1714 may be calculated as a difference between the engine operation map look up 1706 desired continuously variable transmission ratio value 1708 and the actual/measured continuously variable transmission ratio value 1710. The continuously variable transmission ratio error 1714 may then be fed to the control logic/loop 1718 that converts the continuously variable transmission ratio error 1714 into an updated continuously variable transmission ratio 1720 that may then be sent to the superturbocharger actuator 1720 to perform the mechanical operations to change the continuously variable transmission ratio at the continuously variable transmission. The actual/current continuously variable transmission ratio may be delivered to the control logic/loop 1718 if needed as part of the operation to define the updated continuously variable transmission ratio 1720 or as a trouble shooting mechanism to ensure the updated continuously variable transmission ratio 1720 is being properly delivered to and implemented by the superturbocharger actuator.

Further, an engine operation map may be mad of the optimal continuously variable transmission effective drive ratio as a function of engine operating conditions, which may then give a continuously variable transmission effective drive ratio target (desired continuously variable transmission ratio) 1708 for current engine operating conditions. By shifting the transmission (continuously variable transmission) to a specific effective drive ratio across the continuously variable transmission, the effective drive ratio target 1708 may define the speed of the superturbocharger is expected to be at for a given engine speed 1702 and desired load condition 1704. The target/desired continuously variable transmission effective drive ratio 1708 may be measured by the speed sensor input to the continuously variable transmission and the speed sensor output of the continuously variable transmission. The input to output speed of the continuously variable transmission ratio may be controlled to the target/desired continuously variable transmission ratio 1708 for a given engine speed 1702 and load request 1704. The continuously variable transmission ratio control is similar to the compressor speed control disclosed above with respect to FIG. 12 since the continuously variable transmission effective drive ratio for a given engine speed may directly determine the speed of the turbo shaft.

In an embodiment, controller 126 may control the shifting rate of continuously variable transmission 144. Controller 126 may control the shifting rate (i.e., the rate of change of the effective drive ratio of continuously variable transmission 144) to a rate where the power required by the superturbocharger is less than the additional power available from the engine attributable to the extra boost provided by the changing effective drive ratio of the continuously variable transmission 144. In other words, controller 126 may control the shifting rate of continuously variable transmission 144 to prevent the superturbocharger load on the engine (due to, for example, superturbocharger inertia and acceleration) from bogging down the engine. Thus, during an increasing power condition, controller 126 adjusts control signal 140, in response to at least engine speed signal 128, to prevent the engine from experiencing a significant speed dip. Controller 126 may adjust control signal 140 to keep the engine speed from significantly slowing down during a transient by controlling the shifting rate of continuously variable transmission 144. Controller 126 may adjust control signal 140 to achieve a maximum (or near maximum) acceleration of the superturbocharger while at the same time ensuring that the power consumed by the supercharging function is less than the additional engine power that results from the added boot—thus preventing a significant drop in engine speed.

In an embodiment, controller 126 may utilize speed dip detection to select or determine a shifting rate of continuously variable transmission 144 during transient conditions. Controller 126 may allow for a minor drop in engine speed in order to maximize the transient capabilities of the engine and maximize the rate that the engine picks up power. Detection of a small speed dip by controller 126 indicates that the power consumption of the superturbocharger is equal to the additional engine power. Controller 126 may utilize this information to select or determine a maximum or ideal shifting rate of continuously variable transmission 144.

Figure 18:
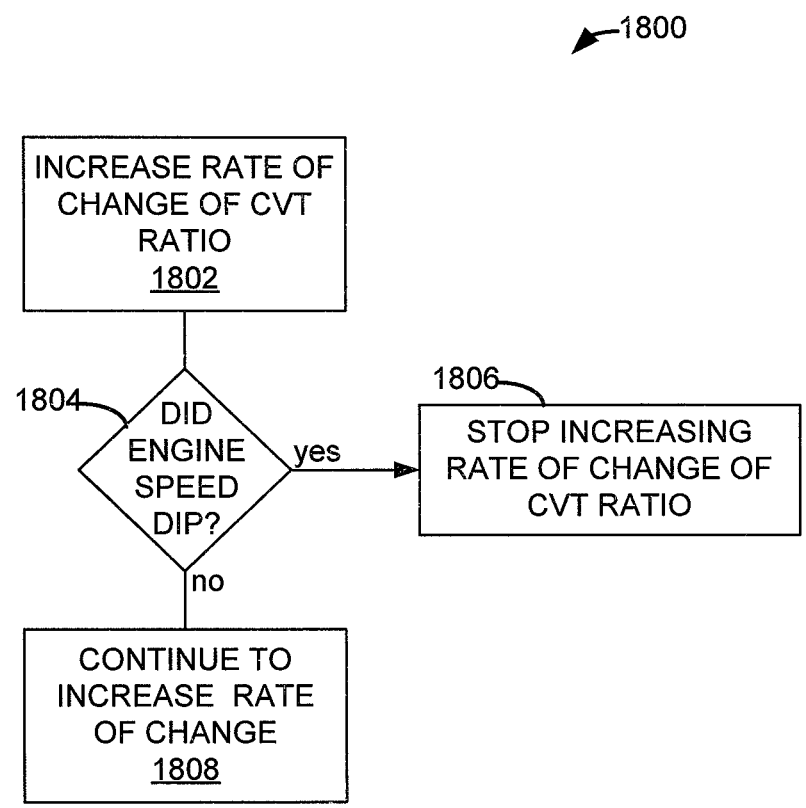
FIG. 18 is a flow chart illustrating the operation of the superturbocharged engine system during increasing continuously variable transmission ratio.

FIG. 18 is a flow chart illustrating the operation of the superturbocharged engine system during increasing continuously variable transmission ratio. In a step 1802, the rate of change of a continuously variable transmission ratio is increased. For example, controller 126 may increase the continuously variable transmission ratio from a steady state (i.e., zero or a fixed rate of change) to an increased rate of change. At step 1804, it is determined whether the increased rate of change caused a dip in engine speed. If so, the process proceeds to step 1806. In step 1806, the rate of change in continuously variable transmission effective drive ratio is stopped from increasing. If it is determined, at step 1804, that the increased rate of change did not cause a dip in engine speed, then the rate of change may be continued to be increased (1808).

In an embodiment, controller 126 may control the shifting rate of continuously variable transmission 144 to a rate that helps prevent the engine from exceeding a torque capacity of the engine system. For example, controller 126 may control (e.g., limit) the shifting rate of continuously variable transmission 144 in order to prevent slipping of the driven road wheels. Controller 126 may receive an input from a traction control system in order to help prevent wheel slipping. Thus, controller 126 may use the shifting rate of continuously variable transmission 144 to help achieve traction control for the entire vehicle by only shifting the superturbocharger at a rate that the engine and traction of the vehicle can handle. This rate of shifting continuously variable transmission 144 may be different for varying conditions (i.e., load, vehicle velocity, etc.). Controller 126 may use inputs from an accelerometer, wheel spin detector, or traction control system as factors to determine a rate that helps prevent the engine from exceeding a torque capacity.

Figure 19:
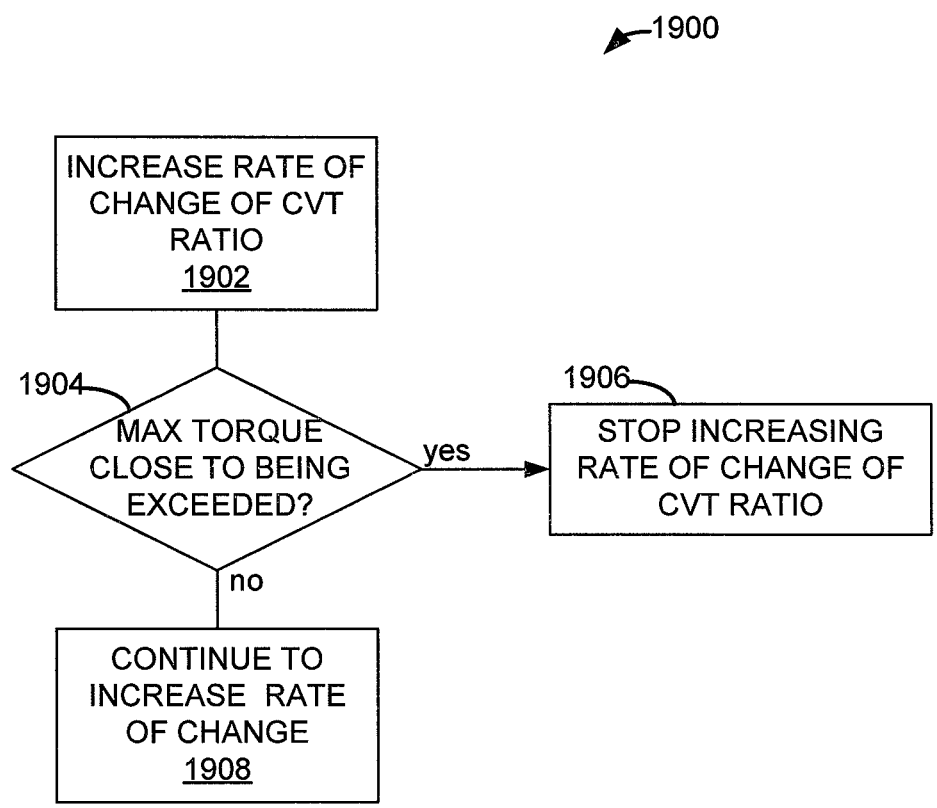
FIG. 19 is a flow chart illustrating the operation of the superturbocharged engine system to limit torque.

FIG. 19 is a flow chart illustrating the operation of the superturbocharged engine system to limit torque. In a step 1902, the rate of change of a continuously variable transmission ratio is increased. For example, controller 126 may increase the continuously variable transmission ratio from a steady state (i.e., zero or a fixed rate of change) to an increased rate of change. At step 1904, it is determined whether the increased rate has caused a maximum torque to be close to being exceeded. Controller 126 may determine whether the increased rate of change caused a maximum torque to be close to being exceeded using inputs from a traction control system, wheel sensors, accelerometers, etc. If so, the process proceeds to step 1906. In step 1906, the rate of change in continuously variable transmission effective drive ratio is stopped from increasing. If it is determined, at step 1904, that the increased rate of change did not cause a maximum torque to be close to being exceeded, then the rate of change may be continued to be increased (1908).

In an embodiment, controller 126 may anticipate future conditions and shift continuously variable transmission 144 to a target ratio. For example, controller 126 may predict a continuously variable transmission effective drive ratio for a predicted future engine operating point. This may help smooth transitions between operating points. Controller 126 may optimize the shifting rate of continuously variable transmission 144 based on new (or predicted) conditions commanded by the driver or conditions controller 126 is alerted to by another vehicle subsystem (e.g., an impending vehicle drive train transmission shift). Controller 126 may use other inputs that indicate a future change in operating conditions to help determine a target effective drive ratio. For example, driver inputs (e.g., brake pedal depressed, accelerator, cruise control state, etc.) or engine operation history may be used by controller 126 to help determine a target effective drive ratio.

Figure 20:
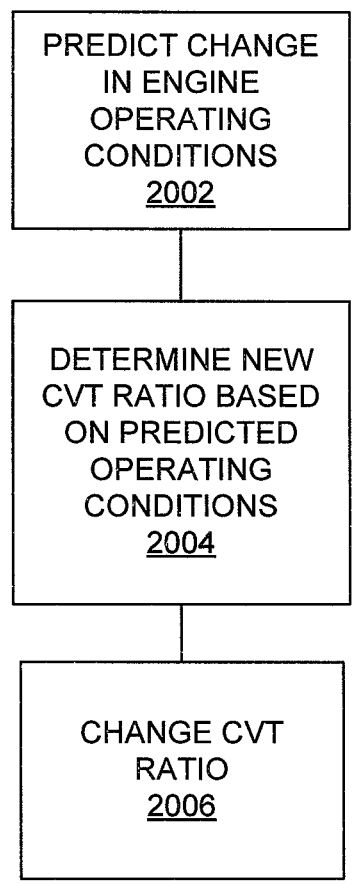
FIG. 20 is a flow chart illustrating the operation of the superturbocharged engine system to anticipate transient changes in operation conditions.

FIG. 20 is a flow chart illustrating the operation of the superturbocharged engine system to anticipate transient changes in operation conditions. In a step 2002, a change in engine operating conditions is predicted. This change may be predicted using a variety of inputs and/or factors. For example, the change in operating conditions may be predicted by controller 126 using inputs that indicate a vehicle drive train transmission shift (up or down) is about to occur.

A new continuously variable transmission effective drive ratio is determined based on predicted operating conditions (2004). For example, controller 126 may predict the engine speed and torque desired for a smooth transition as the vehicle drive train transmission shifts ratios (e.g., shifts from a $3^{rd}$ ratio to a $4^{th}$ ratio). The continuously variable transmission effective drive ratio is changed (2006). For example controller 126 may change the continuously variable transmission effective drive ratio to a new ratio that will help ensure a smooth transition as the transmission shifts ratios.

It should be understood that controller 126 may predict an engine operating condition will change from a first operating condition to a second operating condition (e.g., from a $1^{st}$ ratio to a second ratio). Based on the second operating condition, controller 126 may determine a continuously variable transmission effective drive ratio. This effective drive ratio may be to optimize one or more desired parameters (e.g., smoothness of change, fuel efficiency, acceleration, deceleration, etc.) Controller 126 may then command continuously variable transmission 144 to change its effective drive ratio based on said second operating condition toward the determined effective drive ratio before said engine operating condition fully transitions from a first operating condition to a second operating condition. In other words, controller 126 may command continuously variable transmission 144 to "anticipate" the change in operating conditions. This anticipation may be to optimize the one or more desired parameters.

The controllers, systems, engines, and functions described above may be implemented with or executed by one or more computer systems. The methods described above may also be stored on a computer readable medium. Elements of superturbocharged engine system 100 may be, comprise, or include computer systems. This includes, but is not limited to, controller 126.

Figure 21:
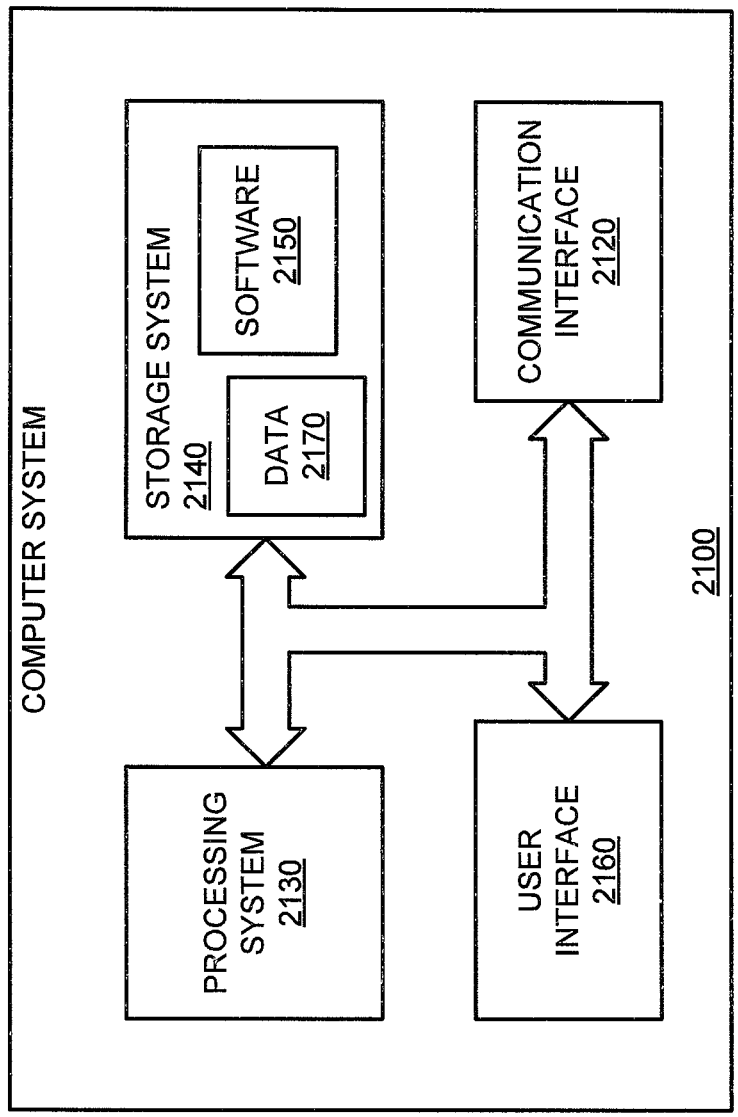
FIG. 21 is a block diagram of a computer system.

FIG. 21 illustrates a block diagram of a computer system. Computer system 2100 includes communication interface 2120, processing system 2130, storage system 2140, and user interface 2160. Processing system 2130 is operatively coupled to storage system 2140. Storage system 2140 stores software 2150 and data 2170. Processing system 2130 is operatively coupled to communication interface 2120 and user interface 2160. Computer system 2100 may comprise a programmed general-purpose computer. Computer system 2100 may include a microprocessor. Computer system 2100 may comprise programmable or special purpose circuitry. Computer system 2100 may be distributed among multiple devices, processors, storage, and/or interfaces that together comprise elements 2120-2170.

Communication interface 2120 may comprise a network interface, modem, port, bus, link, transceiver, or other communication device. Communication interface 2120 may be distributed among multiple communication devices. Processing system 2130 may comprise a microprocessor, microcontroller, logic circuit, or other processing device. Processing system 2130 may be distributed among multiple processing devices. User interface 2160 may comprise a keyboard, mouse, voice recognition interface, microphone and speakers, graphical display, touch screen, or other type of user interface device. User interface 2160 may be distributed among multiple interface devices. Storage system 2140 may comprise a disk, tape, integrated circuit, RAM, ROM, network storage, server, or other memory function. Storage system 2140 may be a computer readable medium. Storage system 2140 may be distributed among multiple memory devices.

Processing system 2130 retrieves and executes software 2150 from storage system 2140. Processing system may retrieve and store data 2170. Processing system may also retrieve and store data via communication interface 2120. Processing system 2150 may create or modify software 2150 or data 2170 to achieve a tangible result. Processing system may control communication interface 2120 or user interface 2170 to achieve a tangible result. Processing system may retrieve and execute remotely stored software via communication interface 2120.

Software 2150 and remotely stored software may comprise an operating system, utilities, drivers, networking software, and other software typically executed by a computer system. Software 2150 may comprise an application program, applet, firmware, or other form of machine-readable processing instructions typically executed by a computer system. When executed by processing system 2130, software 2150 or remotely stored software may direct computer system 2100 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of controlling a superturbocharged engine system comprising:
    detecting engine speed of said engine system;
    detecting engine load of said engine system; and,
    controlling a rate of change of an effective drive ratio of a continuously variable transmission in response to said engine speed and load so that a change in engine speed associated with the change in said effective drive ratio of said continuously variable transmission is within a threshold amount,
        wherein said continuously variable transmission is controlled by at least one of:
            rotational mechanical energy to and from a crankshaft of said engine system; and,
            rotational mechanical energy to and from a shaft coupling a turbine and a compressor of said superturbocharger.

2. The method of claim 1 wherein said process of controlling said rate of change of continuously variable transmission comprises controlling said continuously variable transmission with an electrical control signal.

3. The method of claim 2 further comprising:
    detecting a reduction of said engine speed; and
    limiting said rate of change of said effective drive ratio in response to detecting said reduction of said engine speed.

4. The method of claim 1, further comprising:
    using speed dip detection to select said rate of change of said effective drive ratio.

5. An engine system comprising:
    a superturbocharger comprising:
        turbine means for receiving exhaust gases from said engine system;
        compressor means, coupled to said turbine means with a turbo-shaft, for generating a source of compressed air;
        a continuously variable transmission coupled to said turbo-shaft and said engine; and,
    controller means, coupled to said continuously variable transmission means, for controlling said superturbocharger in response to an indicator of torque capacity so that a torque output by said engine system does not exceed a torque associated with said indicator of torque capacity.

6. An engine system comprising:
    an engine;
    a superturbocharger comprising:
        turbine means for receiving exhaust gases from said engine system;
        compressor means coupled to said turbine means with a turbo-shaft, for generating a source of compressed air;
        a continuously variable transmission coupled to said turbo-shaft and said engine; and,
    a controller coupled to said continuously variable transmission, for controlling said superturbocharger to control a rate of change of an effective drive ratio of said continuously variable transmission means in response to an engine speed so that a change in engine speed associated with said rate of change in said effective drive ratio of said continuously variable transmission is within a threshold amount.

7. An engine system comprising:
    a superturbocharger comprising:
        a turbine that receives exhaust gases from said engine system;
        a compressor coupled to said turbine with a turbo-shaft, that generates a source of compressed air;
        a continuously variable transmission coupled to said turbo-shaft and said engine; and,
    a controller coupled to said continuously variable transmission that controls said superturbocharger to control a rate of change of an effective drive ratio of said continuously variable transmission in response to an engine speed so that a change in engine speed associated with the change in said effective drive ratio of said continuously variable transmission is within a threshold amount.

8. The engine system of claim 7 wherein said continuously variable transmission is coupled to a crankshaft of said engine.

9. The engine system of claim 8 wherein said controller is coupled to said continuously variable transmission with an electrical control signal.

10. An engine system comprising:
    a superturbocharger comprising:
        a turbine that receives exhaust gases from said engine system;
        a compressor coupled to said turbine with a turbo-shaft, that generates a source of compressed air;
        a continuously variable transmission coupled to said turbo-shaft and said engine; and,
    a controller coupled to said continuously variable transmission that controls said superturbocharger in response to an indicator of torque capacity so that a torque output by said superturbocharged engine system does not exceed a torque associated with said indicator of torque capacity.

11. The engine system of claim 10 wherein said continuously variable transmission is coupled to a crankshaft of said engine.

12. The engine system of claim 10 wherein said indicator of torque capacity is received by a traction control system.

13. The engine system of claim 10 wherein said controller controls a rate of change of said continuously variable transmission with an electrical control signal.

* * * * *